US012578550B2

(12) United States Patent
Kim et al.

(10) Patent No.: US 12,578,550 B2
(45) Date of Patent: Mar. 17, 2026

(54) IMAGING LENS SYSTEM

(71) Applicant: SAMSUNG ELECTRO-MECHANICS CO., LTD., Suwon-si (KR)

(72) Inventors: Hag Chul Kim, Suwon-si (KR); Ji Su Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 302 days.

(21) Appl. No.: 18/366,452

(22) Filed: Aug. 7, 2023

(65) Prior Publication Data

US 2024/0184082 A1 Jun. 6, 2024

(30) Foreign Application Priority Data

Dec. 5, 2022 (KR) ......................... 10-2022-0168000

(51) Int. Cl.
*G02B 9/64* (2006.01)
(52) U.S. Cl.
CPC ..................................... *G02B 9/64* (2013.01)
(58) Field of Classification Search
CPC ....................................................... G02B 9/64
See application file for complete search history.

(56) References Cited

U.S. PATENT DOCUMENTS

2015/0309393 A1 10/2015 Kuzuhara et al.
2020/0393653 A1 12/2020 Chen

2022/0082803 A1 3/2022 Lu et al.
2022/0196971 A1 6/2022 Chen et al.
2022/0244501 A1 8/2022 Wang et al.
2022/0283408 A1 9/2022 Tseng et al.

FOREIGN PATENT DOCUMENTS

CN 112859291 A 5/2021
TW 202045973 A 12/2020
TW 202229961 A 8/2022

OTHER PUBLICATIONS

TW I783891 B (Chen, Wei-Yu et al.) machine translation (Year: 2022).*
CN 112859291 A (Wang, Bin-qing et al.) machine translation (Year: 2021).*
Taiwanese Office Action Issued on Apr. 3, 2024, in Counterpart Taiwanese Patent Application No. 112130760 (5 Pages in English, 6 Pages in Chinese).

* cited by examiner

*Primary Examiner* — James A Dudek
(74) *Attorney, Agent, or Firm* — NSIP Law

(57) ABSTRACT

An imaging lens system according to an embodiment of the present disclosure includes a first lens, a second lens, a third lens, a fourth lens, a fifth lens, a sixth lens, a seventh lens, an eighth lens, a ninth lens, and a tenth lens, sequentially disposed from an object-side toward an imaging plane. The following conditional expressions are satisfied, f number$\leq$1.69, and TTL/(2*ImgHT)<0.730 where TTL is a distance from an object-side surface of the first lens to the imaging plane, and ImgHT is a height of the imaging plane.

20 Claims, 11 Drawing Sheets

ASTIGMATIC FIELD CURVES

DISTORTION

300

301 302 303 304 305

306 307 308 309 310

IF

IP  IS

ASTIGMATIC
FIELD CURVES

DISTORTION

IMG HT
S T
6.15

4.61

3.08

1.54

-0.200 -0.100  0.0  0.100  0.200
FOCUS (MILLIMETERS)

IMG HT
6.15

4.61

3.08

1.54

-10.0  -5.0  0.0  5.0  10.0
% DISTORTION

400

401 402 403 404 405

406

407

408

409

410

IF

IP  IS

ASTIGMATIC
FIELD CURVES

DISTORTION

IMG HT

S  T  6.15

4.61

3.08

1.54

-0.200  -0.100  0.0  0.100  0.200
FOCUS (MILLIMETERS)

IMG HT 6.15

4.61

3.08

1.54

-10.0  -5.0  0.0  5.0  10.0
% DISTORTION

IMAGING LENS SYSTEM

CROSS-REFERENCE TO RELATED APPLICATIONS

This application claims the priority and benefit under 35 USC 119(a) of Korean Patent Application No. 10-2022-0168000, filed on Dec. 5, 2022, in the Korean Intellectual Property Office, the entire disclosure of which is incorporated herein by reference for all purposes.

BACKGROUND

1. Field

The present disclosure relates to an imaging lens system capable of implementing high-quality images even in a low-light environment.

2. Description of the Background

A portable electronic device may include a camera module for capturing images or moving images. For example, the camera module may be mounted on a mobile phone, a laptop computer, a game machine, or the like.

A resolution of the camera module may be affected by illuminance of a photographing location together with optical characteristics of the imaging lens system. For example, high resolution imaging is possible in a light environment, but high resolution imaging may be difficult in a dark environment. Therefore, developing an imaging lens system having a low f number to enable high-resolution imaging even in a dark environment may be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, a seventh lens, an eighth lens, a ninth lens, and a tenth lens, sequentially disposed from an object-side toward an imaging plane, wherein the following conditional expressions are satisfied, f number≤1.69, and TTL/(2*ImgHT)<0.730 where TTL is a distance from an object-side surface of the first lens to an imaging plane, and ImgHT is a height of the imaging plane.

The following conditional expression may be satisfied, $0 < f1/f < 30$ where f is a focal length of the imaging lens system, and f1 is a focal length of the first lens.

The following conditional expression may be satisfied, $0 < f2/f < 3.0$ where f is a focal length of the imaging lens system, and f2 is a focal length of the second lens.

The following conditional expression may be satisfied, $-3.0 < f3/f < 0$ where f is a focal length of the imaging lens system, and f3 is a focal length of the third lens.

The following conditional expression may be satisfied, $-200 < f6/f < 200$ where f is a focal length of the imaging lens system, and f6 is a focal length of the sixth lens.

The following conditional expression may be satisfied, $-20 < f7/f$ where f is a focal length of the imaging lens system, and f7 a focal length of the seventh lens.

The following conditional expression may be satisfied, $-30 < f8/f < 3.0$ where f is a focal length of the imaging lens system, and f8 a focal length of the eighth lens.

The following conditional expression may be satisfied, $TTL/f < 1.5$ where f is a focal length of the imaging lens system.

The following conditional expression may be satisfied, $BFL/f < 0.5$ where BFL is a distance from an image-side surface of the tenth lens to the imaging plane, and f is a focal length of the imaging lens system.

An electronic device may include the imaging lens system, wherein the imaging lens system may further include an image sensor, and the imaging plane may be formed on one surface of the image sensor or inside the image sensor.

In another general aspect, an imaging lens system includes a first lens, a second lens, a third lens, a fourth lens, a fifth lens, a sixth lens, a seventh lens, an eighth lens, a ninth lens, and a tenth lens, sequentially disposed from an object side toward an imaging plane, wherein the following conditional expression is satisfied, $10 < f1/f2 < 20$ where f1 is a focal length of the first lens, and f2 is a focal length of the second lens.

The following conditional expression may be satisfied, $-0.6 < f4/f6 < -0.20$ where f4 is a focal length of the fourth lens, and f6 is a focal length of the sixth lens.

The following conditional expression may be satisfied, $14 < |(f7+f8)|/f9 < 21$ where f7 is a focal length of the seventh lens, f8 is a focal length of the eighth lens, and f9 is a focal length of the ninth lens.

The following conditional expression may be satisfied, $-1.4 < f3/f9 < -0.8$ where f3 is a focal length of the third lens, and f9 is a focal length of the ninth lens.

The following conditional expression may be satisfied, $0.8 < f3/f10 < 2.0$ where f3 is a focal length of the third lens, and f10 is a focal length of the tenth lens.

The following conditional expression may be satisfied, $-0.1 < f3/f9+f3/f10 < 1.0$ where f3 is a focal length of the third lens, f9 is a focal length of the ninth lens, and f10 is a focal length of the tenth lens.

The following conditional expression may be satisfied, $-4.0 < (R17+R18)/(R17-R18) < -3.0$ where R17 is a radius of curvature of an object-side surface of the ninth lens, and R18 is a radius of curvature of an image-side surface of the ninth lens.

An electronic device may include one or more cameras, wherein at least one of the one or more cameras may include the imaging lens system.

In another general aspect, an imaging lens system includes a first lens having positive refractive power, a second lens having positive refractive power, a third lens having refractive power, a fourth lens having refractive power, a fifth lens having refractive power and a convex image-side surface, a sixth lens having refractive power and a concave image-side surface, a seventh lens having refractive power and a convex object-side surface, an eighth lens having negative refractive power, a ninth lens having refractive power, a tenth lens having refractive power, wherein the first lens to the tenth lens are sequentially disposed from an object side toward an imaging plane, wherein the following conditional expression is satisfied, f number≤1.69.

An electronic device may include one or more cameras, wherein at least one of the one or more cameras may include the imaging lens system, wherein the imaging lens system may further include an image sensor, and the imaging plane may be formed on one surface of the image sensor or inside the image sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
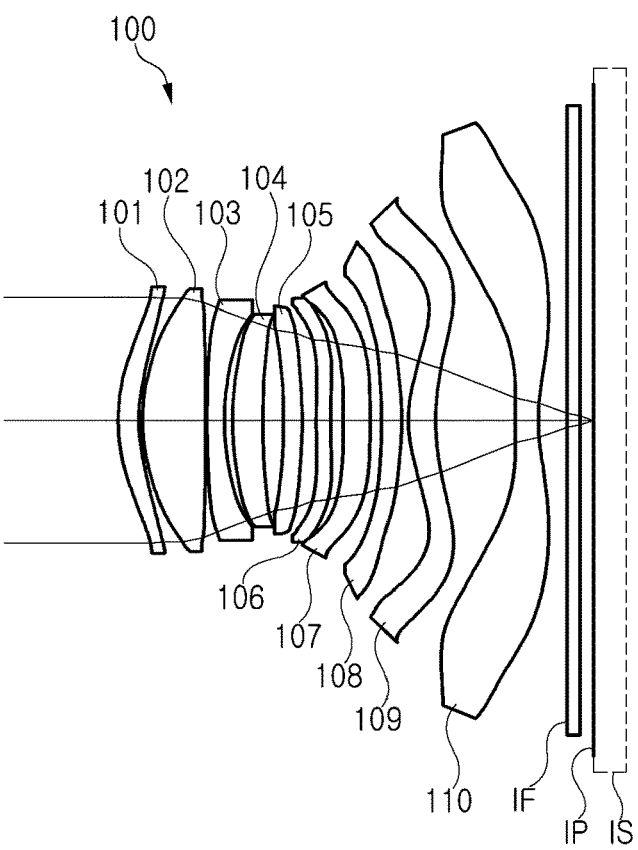
FIG. 1 is a configuration diagram of an imaging lens system according to a first embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In describing the present disclosure below, terms referring to the components of the present disclosure are named in consideration of the function of each component, and thus should not be construed as limiting the technical components of the present disclosure.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may be to provide an imaging lens system capable of high-resolution imaging even in a low-light environment.

Another aspect of the present disclosure may be to provide an imaging lens system having a wide field of view while having a low f number.

In the present specification, a first lens refers to a lens most adjacent to an object (or a subject), and a tenth lens refers to a lens most adjacent to an imaging plane (or an image sensor). In the present specification, units of a radius of curvature, a thickness, TTL (a distance from an object-side surface of the first lens to an imaging plane), ImgHT (a height of an imaging plane), and a focal length of the lens are represented in millimeters (mm).

A thickness of a lens, a distance between lenses, and a TTL refer to a distance of a lens along an optical axis. In addition, in the descriptions of a shape of a lens, the configuration in which one surface is convex indicates that a paraxial region of the surface is convex, and one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

The imaging lens system described herein may be configured to be mounted in a portable electronic device. For example, the imaging lens system may be mounted in a smartphone, a notebook computer, an augmented reality device, a virtual reality device (VR), a portable game machine, or the like. However, the range and examples of use of the imaging lens system described herein are not limited to the above-described electronic device. For example, the imaging lens system may provide a narrow mounting space, but may be applied to an electronic device requiring high-resolution imaging.

An imaging lens system according to a first aspect of the present disclosure may include a plurality of lenses. For example, the imaging lens system may include a first lens, a second lens, a third lens, a fourth lens, a fifth lens, a sixth lens, a seventh lens, an eighth lens, a ninth lens, and a tenth lens, sequentially disposed from an object side. The imaging lens system according to the first aspect may have a low f number. For example, the f number of the imaging lens system according to the first aspect may be 1.69 or less. The imaging lens system according to the first aspect may satisfy a specific conditional expression. For example, the imaging lens system according to the first aspect may satisfy a conditional expression of TTL/(2*ImgHT)<0.73. In the conditional expression, TTL is a distance from the object-side surface of the first lens to an imaging plane, and ImgHT is a height of the imaging plane.

An imaging lens system according to a second aspect of the present disclosure may include a plurality of lenses. For example, the imaging lens system may include a first lens, a second lens, a third lens, a fourth lens, a fifth lens, a sixth lens, a seventh lens, an eighth lens, a ninth lens, and a tenth lens, sequentially disposed from an object side. The imaging lens system according to the second aspect may satisfy a specific conditional expression. For example, the imaging lens system according to the second aspect may satisfy a conditional expression of $10 < f1/f2 < 20$. In the conditional expression, f1 is a focal length of the first lens, and f2 is a focal length of the second lens.

An imaging lens system according to a third aspect of the present disclosure may include a first lens, a second lens, a third lens, a fourth lens, a fifth lens, a sixth lens, a seventh lens, an eighth lens, a ninth lens, and a tenth lens, sequentially disposed from an object side, wherein the imaging lens system according to the third aspect may satisfy at least one of the following conditional expressions.

$0 < f1/f < 30$
$0 < f2/f < 3.0$
$-3.0 < f3/f < 0$
$-100 < f4/f < 10$
$-10 < f5/f < 100$
$-200 < f6/f < 200$
$-20 < f7/f$
$-30 < f8/f < 3.0$
$0 < f9/f < 3.0$
$V1 - V3 < 45$
$V1 - V5 < 45$
$TTL/f < 1.5$
$BFL/f < 0.5$
$TTL/(2*ImgHT) < 0.73$
$60 < FOV*ImgHT/f$
$f \text{ number} \leq 1.69$
$SWA11 < 25°$
$SWA21 < 36°$ In the above conditional expressions, f is a focal length of the imaging lens system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f8 is a focal length of the eighth lens, f9 is a focal length of the ninth lens, V1 is an Abbe number of the first lens, V3 is an Abbe number of the third lens, V5 is an Abbe number of the fifth lens, TTL is a distance from an object-side surface of the first lens to an imaging plane, BFL is a distance from an image-side surface of the tenth lens to the imaging plane, ImgHT is a height of the imaging plane, FOV is a field of view of the imaging lens system, SWA11 is a maximum sweep angle of the object-side surface of the first lens, and SWA21 is a maximum sweep angle of the object-side surface of the second lens.

The imaging lens system according to the third aspect of the present disclosure may satisfy a more limited numerical range for some conditional expressions as follows.

$-12 < f7/f < -5$
$30 < V1 - V3 < 45$

30<V1−V5<45
1.20<TTL/f<1.30
0.12<BFL/f<0.16
0.67<TTL/(2*ImgHT)<0.73
64<FOV*ImgHT/f<74
20°<SWA11<22°
30°<SWA21<36°

An imaging lens system according to a fourth aspect of the present disclosure may include a first lens, a second lens, a third lens, a fourth lens, a fifth lens, a sixth lens, a seventh lens, an eighth lens, a ninth lens, and a tenth lens, wherein the imaging lens system according to the fourth aspect may satisfy at least one of the following conditional expressions.

10<f1/f2<20
−0.60<f4/f6<−0.20
14<|(f7+f8)|/f9<21
−1.4<f3/f9<−0.8
0.80<f3/f10<2.0
−0.10<f3/f9+f3/f10<1.0
−4.0<(R17+R18)/(R17−R18)<−3.0

In the above conditional expressions, f10 is a focal length of the tenth lens, R17 is a radius of curvature of the object-side surface of the ninth lens, and R18 is a radius of curvature of the image-side surface of the ninth lens.

The imaging lens systems according to the first to fourth aspects may include at least one of lenses having the following characteristics as needed. For example, the imaging lens system according to the first aspect may include at least one of the first to tenth lenses according to the following characteristics. As another example, the imaging lens system according to the second aspect may include two or more of the first to tenth lenses according to the following characteristics. However, the imaging lens system according to the above-described aspects does not necessarily include a lens according to the following characteristics.

Hereinafter, the characteristics of the first to tenth lenses will be described.

The first lens has refractive power. For example, the first lens may have positive refractive power. One surface of the first lens may be convex. For example, an object-side surface of the first lens may be convex. The first lens includes a spherical surface or an aspherical surface. For example, both surfaces of the first lens may be aspherical. The first lens may be formed of a material having high light transmittance and excellent workability. For example, the first lens may be formed of a plastic material or a glass material. The first lens may be configured to have a predetermined refractive index. For example, the refractive index of the first lens may be lower than 1.6. As a specific example, the refractive index of the first lens may be greater than 1.52 and lower than 1.57. The first lens may have a predetermined Abbe number. For example, the Abbe number of the first lens may be less than 60. As a specific example, the Abbe number of the first lens may be greater than 53 and lower than 58.

The second lens has refractive power. For example, the second lens may have positive refractive power. One surface of the second lens may be convex. For example, an object-side surface of the second lens may be convex. The second lens includes a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a predetermined refractive index. For example, the refractive index of the second lens may be lower than 1.6. As a specific example, the refractive index of the second lens may be greater than 1.52 and lower than 1.57. The second lens may have a predetermined Abbe number. For example, the Abbe number of the second lens may be less than 60. As a specific example, the Abbe number of the second lens may be greater than 53 and lower than 58.

The third lens has refractive power. For example, the third lens may have negative refractive power. One surface of the third lens may be convex. For example, an object-side surface of the third lens may be convex. The third lens includes a spherical surface or an aspherical surface. For example, both surfaces of the third lens may be aspherical. The third lens may be formed of a material having high light transmittance and excellent workability. For example, the third lens may be formed of a plastic material or a glass material. The third lens may be configured to have a predetermined refractive index. For example, the refractive index of the third lens may be greater than 1.6. As a specific example, the refractive index of the third lens may be greater than 1.62 and lower than 1.7. The third lens may have a predetermined Abbe number. For example, the Abbe number of the third lens may be less than 30. As a specific example, the Abbe number of the third lens may be greater than 20 and lower than 30.

The fourth lens has refractive power. For example, the fourth lens may have positive refractive power. One surface of the fourth lens may be convex. For example, an object-side surface of the fourth lens may be convex. The fourth lens includes a spherical surface or an aspherical surface. For example, both surfaces of the second lens may be aspherical. The fourth lens may be formed of a material having high light transmittance and excellent workability. For example, the fourth lens may be formed of a plastic material or a glass material. The fourth lens may be configured to have a predetermined refractive index. For example, the refractive index of the fourth lens may be greater than 1.5. As a specific example, the refractive index of the fourth lens may be greater than 1.5 and lower than 1.6. The fourth lens may have a predetermined Abbe number. For example, the Abbe number of the fourth lens may be greater than 50. As a specific example, the Abbe number of the fourth lens may be greater than 50 and lower than 60.

The fifth lens has refractive power. For example, the fifth lens may have positive or negative refractive power. At least one surface of the fifth lens may be convex. For example, an image-side surface of the fifth lens may be convex. The fifth lens includes a spherical surface or an aspherical surface. For example, both surfaces of the fifth lens may be aspherical. The fifth lens may be formed of a material having high light transmittance and excellent workability. For example, the fifth lens may be formed of a plastic material or a glass material. The fifth lens may be configured to have a predetermined refractive index. For example, the refractive index of the fifth lens may be greater than 1.6. As a specific example, the refractive index of the fifth lens may be greater than 1.64 and lower than 1.7. The fifth lens may have a predetermined Abbe number. For example, the Abbe number of the fifth lens may be less than 30. As a specific example, the Abbe number of the fifth lens may be greater than 16 and lower than 30.

The sixth lens has refractive power. For example, the sixth lens may have negative refractive power. One surface of the sixth lens may be concave. For example, an image-side surface of the sixth lens may be concave. The sixth lens includes a spherical surface or an aspherical surface. For example, both surfaces of the sixth lens may be aspherical. An inflection point may be formed on one surface or both surfaces of the sixth lens. For example, an inflection point may be formed an object-side surface and an image-side surface of the sixth lens. The sixth lens may be formed of a material having high light transmittance and excellent workability. For example, the sixth lens may be formed of a plastic material or a glass material. The sixth lens may be configured to have a predetermined refractive index. For example, the refractive index of the sixth lens may be greater than 1.6. As a specific example, the refractive index of the sixth lens may be greater than 1.64 and lower than 1.7. The sixth lens may have a predetermined Abbe number. For example, the Abbe number of the sixth lens may be less than 30. As a specific example, the Abbe number of the sixth lens may be greater than 16 and lower than 30.

The seventh lens has refractive power. For example, the seventh lens may have positive or negative refractive power. One surface of the seventh lens may be convex. For example, an object-side surface of the seventh lens may be convex. The seventh lens includes a spherical surface or an aspherical surface. For example, both surfaces of the seventh lens may be aspherical. An inflection point may be formed on one surface or both surfaces of the seventh lens. For example, an inflection point may be formed an object-side surface and an image-side surface of the seventh lens. The seventh lens may be formed of a material having high light transmittance and excellent workability. For example, the seventh lens may be formed of a plastic material or a glass material. The seventh lens may be configured to have a predetermined refractive index. For example, the refractive index of the seventh lens may be greater than 1.52. As a specific example, the refractive index of the seventh lens may be greater than 1.52 and lower than 1.64. The seventh lens may have a predetermined Abbe number. For example, the Abbe number of the seventh lens may be less than 60. As a specific example, the Abbe number of the seventh lens may be greater than 50 and lower than 60.

The eighth lens has refractive power. For example, the eighth lens may have negative refractive power. One surface of the eighth lens may be concave. For example, an object-side surface of the eighth lens may be concave. The eighth lens includes a spherical surface or an aspherical surface. For example, both surfaces of the eighth lens may be aspherical. An inflection point may be formed on one surface or both surfaces of the eighth lens. For example, an inflection point may be formed on an object-side surface and an image-side surface of the eighth lens. The eighth lens may be formed of a material having high light transmittance and excellent workability. For example, the eighth lens may be formed of a plastic material or a glass material. The eighth lens may be configured to have a predetermined refractive index. For example, the refractive index of the eighth lens may be greater than 1.6. As a specific example, the refractive index of the eighth lens may be greater than 1.6 and lower than 1.7. The eighth lens may have a predetermined Abbe number. For example, the Abbe number of the eighth lens may be less than 30. As a specific example, the Abbe number of the eighth lens may be greater than 20 and lower than 30.

The ninth lens has refractive power. For example, the ninth lens may have positive refractive power. One surface of the ninth lens may be convex. For example, an object-side surface of the ninth lens may be convex. The ninth lens includes a spherical surface or an aspherical surface. For example, both surfaces of the ninth lens may be aspherical. An inflection point may be formed on one surface or both surfaces of the ninth lens. For example, an inflection point may be formed on an object-side surface and an image-side surface of the ninth lens. In addition, concave and convex shapes may be formed on one surface or both surfaces of the ninth lens. For example, an optical axis portion in an object-side surface of the ninth lens may be formed to be convex, and a peripheral portion of an optical axis in the object-side surface of the ninth lens may be formed to be concave. The ninth lens may be formed of a material having high light transmittance and excellent workability. For example, the ninth lens may be formed of a plastic material or a glass material. The ninth lens may be configured to have a predetermined refractive index. For example, the refractive index of the ninth lens may be greater than 1.6. As a specific example, the refractive index of the ninth lens may be greater than 1.5 and lower than 1.6. The ninth lens may have a predetermined Abbe number. For example, the Abbe number of the ninth lens may be greater than 50. As a specific example, the Abbe number of the ninth lens may be greater than 50 and lower than 60.

The tenth lens has refractive power. For example, the tenth lens may have negative refractive power. One surface of the tenth lens may be convex. For example, an object-side surface of the tenth lens may be convex. The tenth lens includes a spherical surface or an aspherical surface. For example, both surfaces of the tenth lens may be aspherical. An inflection point may be formed on one surface or both surfaces of the tenth lens. For example, an inflection point may be formed an object-side surface and an image-side surface of the tenth lens. In addition, concave and convex shapes may be formed on one surface or both surfaces of the tenth lens. For example, an optical axis portion in an object-side surface of the tenth lens may be formed to be convex, and a peripheral portion of an optical axis in the object-side surface of the tenth lens may be formed to be concave. The tenth lens may be formed of a material having high light transmittance and excellent workability. For example, the tenth lens may be formed of a plastic material or a glass material. The tenth lens may be configured to have a predetermined refractive index. For example, the refractive index of the tenth lens may be lower than 1.6. As a specific example, the refractive index of the tenth lens may be greater than 1.5 and lower than 1.6. The tenth lens may have a predetermined Abbe number. For example, the Abbe number of the tenth lens may be greater than 50. As a specific example, the Abbe number of the tenth lens may be greater than 50 and lower than 60.

As described above, the first to tenth lenses may include a spherical surface or an aspheric surface. When the first to tenth lenses include an aspherical surface, the aspherical surface of the corresponding lens may be expressed by Equation 1.

$$Z = \frac{cr^2}{1+\sqrt{1-(1+k)c^2r^2}} + Ar^4 + Br^6 + \qquad \text{Equation 1}$$
$$Cr^8 + Dr^{10} + Er^{12} + Fr^{14} + Gr^{16} + Hr^{18} + Jr^{20}$$

In Equation 1, c is a reciprocal of a radius of curvature of the corresponding lens, k is a conic constant, r is a distance from a certain point on an aspherical surface to an optical axis, A to H and J are aspherical surface constants, and Z (or SAG) is a height from a certain point on the aspherical surface to an apex of the corresponding aspherical surface in an optical axis direction.

The imaging lens system according to the above-described embodiment or the above-described form may further include a stop and a filter. For example, the imaging lens system may further include a stop disposed in front of the first lens or between adjacent lenses. As an example, the imaging lens system may further include a filter disposed between the tenth lens and an imaging plane. The stop may be configured to adjust an amount of light incident in a direction of the imaging plane, and the filter may be configured to block light of a specific wavelength. For reference, the filter described herein is configured to block infrared rays, but light of a wavelength that is blocked by the filter is not limited to infrared rays.

Hereinafter, specific embodiments of the imaging lens system will be described with reference to the drawings.

First, an imaging lens system according to a first embodiment will be described with reference to FIG. 1.

An imaging lens system 100 includes a first lens 101, a second lens 102, a third lens 103, a fourth lens 104, a fifth lens 105, a sixth lens 106, a seventh lens 107, an eighth lens 108, a ninth lens 109, and a tenth lens 110.

The first lens 101 has positive refractive power, and has a convex object-side surface and a concave image-side surface. The second lens 102 has positive refractive power and has a convex object-side surface and a concave image-side surface. The third lens 103 has negative refractive power, and has a convex object-side surface and a concave image-side surface. The fourth lens 104 has positive refractive power, and has a convex object-side surface and a concave image-side surface. The fifth lens 105 has negative refractive power, and has a concave object-side surface and a convex image-side surface. The sixth lens 106 has negative refractive power, and has a convex object-side surface and a concave image-side surface. In addition, an inflection point is formed on the object-side surface and the image-side surface of the sixth lens 106. The seventh lens 107 has negative refractive power, and has a convex object-side surface and a concave image-side surface. In addition, an inflection point is formed on the object-side surface and the image-side surface of the seventh lens 107. The eighth lens 108 has negative refractive power, and has a concave object-side surface and a convex image-side surface. In addition, an inflection point is formed on the object-side surface and the image-side surface of the eighth lens 108. The ninth lens 109 has positive refractive power, and has a convex object-side surface and a concave image-side surface. In addition, an inflection point is formed on the object-side surface and the image-side surface of the ninth lens 109. The tenth lens 110 has negative refractive power, and has a convex object-side surface and a concave image-side surface. In addition, an inflection point is formed on the object-side surface and the image-side surface of the tenth lens 110.

The imaging lens system 100 may further include a filter IF and an imaging plane IP. The filter IF may be disposed between the tenth lens 110 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 2:
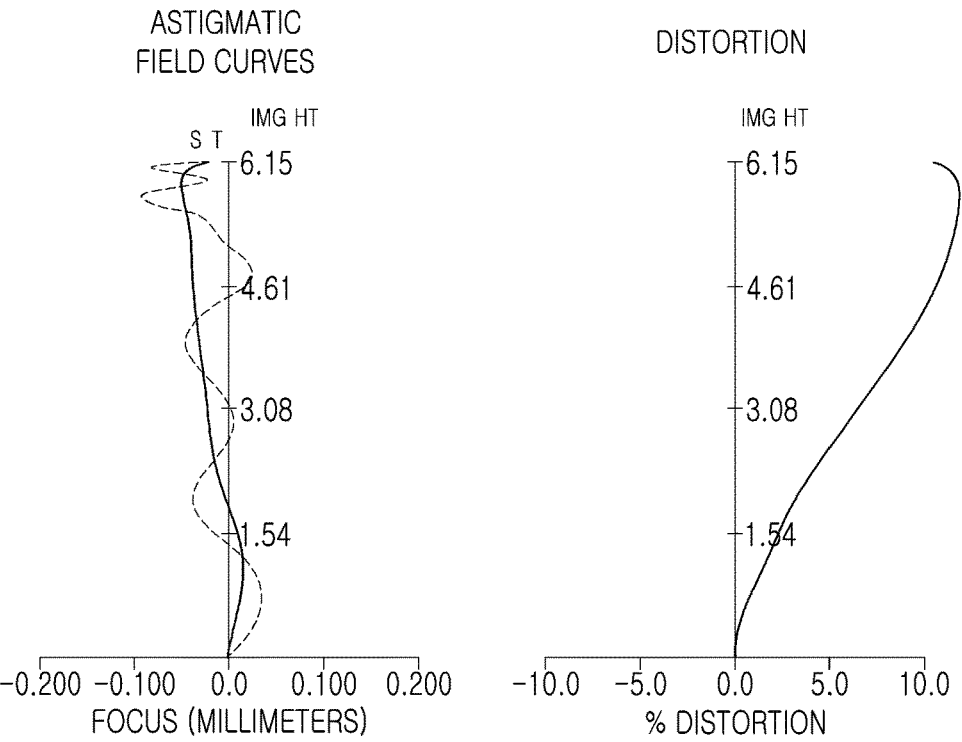
FIG. 2 shows aberration curves of the imaging lens system illustrated in FIG. 1.

Tables 1 and 2 illustrate lens characteristics and aspherical surface values of the imaging lens system according to the present embodiment. FIG. 2 shows aberration curves of the imaging lens system according to the present embodiment.

TABLE 1

| Surface No. | Components | Radius of curvature | Thickness/ distance | Refractive index | Abbe number |
|---|---|---|---|---|---|
| S1 | First lens | 3.1104 | 0.360 | 1.544 | 55.990 |
| S2 | | 3.2100 | 0.057 | | |
| S3 | Second lens | 3.0518 | 1.077 | 1.544 | 55.990 |
| S4 | | 54.5167 | 0.030 | | |
| S5 | Third lens | 15.4619 | 0.300 | 1.639 | 23.490 |
| S6 | | 4.5218 | 0.141 | | |
| S7 | Fourth lens | 5.2964 | 0.517 | 1.544 | 55.990 |
| S8 | | 10.5078 | 0.355 | | |
| S9 | Fifth lens | −11.0609 | 0.320 | 1.671 | 19.240 |
| S10 | | −11.3213 | 0.244 | | |
| S11 | Sixth lens | 28.0850 | 0.253 | 1.671 | 19.240 |
| S12 | | 15.0553 | 0.212 | | |
| S13 | Seventh lens | 92.1834 | 0.454 | 1.544 | 55.990 |
| S14 | | 20.6853 | 0.205 | | |
| S15 | Eighth lens | −7.3445 | 0.325 | 1.615 | 25.900 |
| S16 | | −8.4390 | 0.126 | | |
| S17 | Ninth lens | 2.2978 | 0.468 | 1.544 | 55.990 |
| S18 | | 4.3438 | 1.366 | | |
| S19 | Tenth lens | 31.6138 | 0.400 | 1.535 | 55.740 |
| S20 | | 3.2447 | 0.499 | | |
| S21 | Filter | Infinity | 0.210 | 1.517 | 64.200 |
| S22 | | Infinity | 0.731 | | |
| S23 | Imaging plane | Infinity | 0.020 | | |

TABLE 2

| Surface No. | S1 | S2 | S3 | S4 | S5 | S6 | S7 |
|---|---|---|---|---|---|---|---|
| K | −5.189E+00 | −1.122E+01 | −4.790E+00 | 9.900E+01 | 2.195E+01 | 4.573E+00 | −5.798E+00 |
| A | 1.288E−02 | 1.621E−02 | −2.167E−04 | 1.186E−02 | 1.454E−02 | −2.105E−03 | −2.019E−03 |
| B | 3.685E−03 | −4.794E−02 | −1.040E−02 | −5.159E−02 | −6.792E−02 | −3.600E−02 | 1.296E−03 |
| C | −3.607E−02 | 8.150E−02 | 2.119E−02 | 6.586E−02 | 9.615E−02 | 5.823E−02 | −1.065E−02 |
| D | 7.866E−02 | −9.120E−02 | −1.880E−02 | −4.693E−02 | −7.376E−02 | −4.798E−02 | 2.160E−02 |
| E | −9.849E−02 | 6.851E−02 | 1.016E−02 | 2.057E−02 | 3.469E−02 | 2.187E−02 | −2.101E−02 |
| F | 7.959E−02 | −3.535E−02 | −3.395E−03 | −5.680E−03 | −1.023E−02 | −4.928E−03 | 1.158E−02 |
| G | −4.392E−02 | 1.269E−02 | 6.817E−04 | 9.681E−04 | 1.848E−03 | 1.887E−04 | −3.629E−03 |
| H | 1.702E−02 | −3.158E−03 | −7.542E−05 | −9.366E−05 | −1.874E−04 | 1.265E−04 | 6.045E−04 |
| J | −4.676E−03 | 5.295E−04 | 3.531E−06 | 3.957E−06 | 8.193E−06 | −1.753E−05 | −4.156E−05 |
| L | 9.059E−04 | −5.544E−05 | 0.000E+00 | 0.000E+00 | 0.000E+00 | 0.000E+00 | 0.000E+00 |
| M | −1.208E−04 | 2.851E−06 | 0.000E+00 | 0.000E+00 | 0.000E+00 | 0.000E+00 | 0.000E+00 |
| N | 1.055E−05 | 2.987E−08 | 0.000E+00 | 0.000E+00 | 0.000E+00 | 0.000E+00 | 0.000E+00 |
| O | −5.405E−07 | −1.062E−08 | 0.000E+00 | 0.000E+00 | 0.000E+00 | 0.000E+00 | 0.000E+00 |
| P | 1.230E−08 | 3.348E−10 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.948E+01 | 1.210E+01 | 8.813E+00 | 6.167E+01 | −5.092E+01 | −9.900E+01 | 4.680E+01 |
| A | −1.049E−03 | 1.420E−02 | 2.505E−05 | −2.545E−02 | −2.411E−02 | −8.914E−02 | −1.205E−01 |

TABLE 2-continued

| | | | | | | |
|---|---|---|---|---|---|---|
| B | 4.315E−04 | −9.980E−02 | 4.620E−03 | 3.147E−02 | 4.667E−02 | 5.434E−02 | 1.223E−01 |
| C | −6.369E−03 | 3.197E−01 | −4.973E−02 | −2.147E−01 | 8.220E−02 | −1.143E−02 | −1.922E−01 |
| D | 1.275E−02 | −6.471E−01 | 1.372E−01 | 5.832E−01 | −2.578E−02 | −1.576E−02 | 3.235E−01 |
| E | −1.256E−02 | 8.952E−01 | −1.703E−01 | −8.834E−01 | −8.288E−02 | 6.423E−02 | −3.823E−01 |
| F | 6.868E−03 | −8.844E−01 | 7.913E−02 | 8.278E−01 | 1.270E−01 | −1.374E−01 | 2.977E−01 |
| G | −2.044E−03 | 6.415E−01 | 5.458E−02 | −4.910E−01 | −8.811E−02 | 1.614E−01 | −1.577E−01 |
| H | 3.030E−04 | −3.480E−01 | −1.115E−01 | 1.738E−01 | 3.442E−02 | −1.155E−01 | 5.847E−02 |
| J | −1.663E−05 | 1.423E−01 | 8.405E−02 | −2.523E−02 | −7.047E−03 | 5.364E−02 | −1.540E−02 |
| L | 0.000E+00 | −4.364E−02 | −3.738E−02 | −6.568E−02 | 2.130E−04 | −1.660E−02 | 2.878E−03 |
| M | 0.000E+00 | 9.788E−03 | 1.055E−02 | 4.246E−03 | 2.561E−04 | 3.410E−03 | −3.732E−04 |
| N | 0.000E+00 | −1.518E−03 | −1.862E−03 | −9.705E−04 | −6.342E−05 | −4.469E−04 | 3.200E−05 |
| O | 0.000E+00 | 1.451E−04 | 1.883E−04 | 1.101E−04 | 6.526E−06 | 3.388E−05 | −1.632E−06 |
| P | 0.000E+00 | −6.418E−06 | −8.343E−06 | −5.146E−06 | −2.599E−07 | −1.131E−06 | 3.753E−08 |

| Surface No. | S15 | S16 | S17 | S18 | S19 | S20 |
|---|---|---|---|---|---|---|
| K | 4.031E+00 | 2.028E+00 | −6.748E+00 | −1.412E+01 | 2.842E+01 | −7.586E+00 |
| A | 3.383E−02 | 2.654E−02 | 1.642E−02 | 3.257E−02 | −5.671E−02 | −3.113E−02 |
| B | −3.398E−02 | −6.546E−02 | −4.721E−02 | −3.357E−02 | 4.343E−03 | 2.681E−03 |
| C | −1.044E−02 | 7.260E−02 | 4.559E−02 | 1.840E−02 | 5.337E−03 | 1.748E−03 |
| D | 9.831E−02 | −4.046E−02 | −2.923E−02 | −6.495E−02 | −2.822E−03 | −7.515E−04 |
| E | −1.437E−01 | 7.890E−03 | 1.342E−02 | 1.454E−03 | 7.765E−04 | 1.489E−04 |
| F | 1.113E−01 | 3.582E−03 | −4.581E−03 | −1.980E−04 | −1.395E−04 | −1.777E−05 |
| G | −5.463E−02 | −3.040E−03 | 1.172E−03 | 1.260E−05 | 1.736E−05 | 1.326E−06 |
| H | 1.820E−02 | 1.058E−03 | −2.234E−04 | 6.581E−07 | −1.531E−06 | −5.679E−08 |
| J | −4.237E−03 | −2.244E−04 | 3.139E−05 | −2.271E−07 | 9.629E−08 | 6.723E−10 |
| L | 6.930E−04 | 3.142E−05 | −3.191E−06 | 2.359E−08 | −4.292E−09 | 6.926E−11 |
| M | −7.822E−05 | −2.927E−06 | 2.273E−07 | −1.377E−09 | 1.325E−10 | −4.488E−12 |
| N | 5.812E−06 | 1.753E−07 | −1.073E−08 | 4.749E−11 | −2.696E−12 | 1.277E−13 |
| O | −2.560E−07 | −6.125E−09 | 3.010E−10 | −8.947E−13 | 3.253E−14 | −1.868E−15 |
| P | 5.064E−09 | 9.505E−11 | −3.790E−12 | 6.975E−15 | −1.764E−16 | 1.141E−17 |

Figure 3:
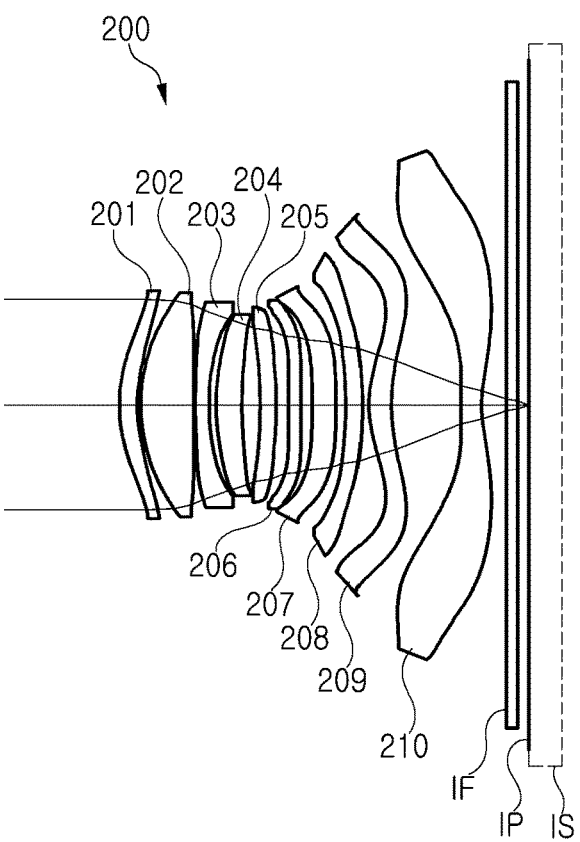
FIG. 3 is a configuration diagram of an imaging lens system according to a second embodiment.

An imaging lens system according to a second embodiment will be described with reference to FIG. 3.

An imaging lens system 200 includes a first lens 201, a second lens 202, a third lens 203, a fourth lens 204, a fifth lens 205, a sixth lens 206, a seventh lens 207, an eighth lens 208, a ninth lens 209, and a tenth lens 210.

The first lens 201 has positive refractive power, and has a convex object-side surface and a concave image-side surface. The second lens 202 has positive refractive power, and has a convex object-side surface and a concave image-side surface. The third lens 203 has negative refractive power, and has a convex object-side surface and a concave image-side surface. The fourth lens 204 has positive refractive power, and has a convex object-side surface and a concave image-side surface. The fifth lens 205 has negative refractive power, and has a concave object-side surface and a convex image-side surface. The sixth lens 206 has negative refractive power, and has a convex object-side surface and a concave image-side surface. In addition, an inflection point is formed on the object-side surface and the image-side surface of the sixth lens 206. The seventh lens 207 has negative refractive power, and has a convex object-side surface and a concave image-side surface. In addition, an inflection point is formed on the object-side surface and the image-side surface of seventh lens 207. The eighth lens 208 has negative refractive power, and has a concave object-side surface and a convex image-side surface. In addition, an inflection point is formed on the object-side surface and the image-side surface of the eighth lens 208. The ninth lens 209 has positive refractive power, and has a convex object-side surface and a concave image-side surface. In addition, an inflection point is formed on the object-side surface and the image-side surface of the ninth lens 209. The tenth lens 210 has negative refractive power, and has a convex object-side surface and a concave image-side surface. In addition, an inflection point is formed on the object-side surface and the image-side surface of the tenth lens 210.

The imaging lens system 200 may further include a filter IF and an imaging plane IP. The filter IF may be disposed between the tenth lens 210 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 4:
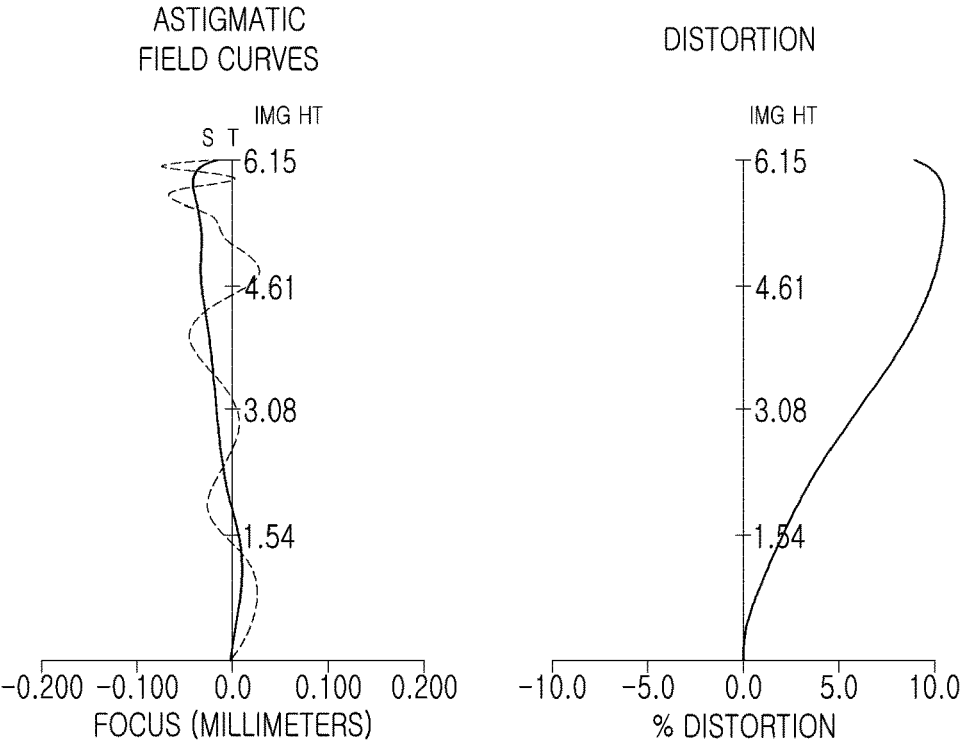
FIG. 4 shows aberration curves of the imaging lens system illustrated in FIG. 3.

Tables 3 and 4 illustrate lens characteristics and aspherical surface values of the imaging lens system according to the present embodiment. FIG. 4 shows aberration curves of the imaging lens system according to the present embodiment.

TABLE 3

| Surface No. | Components | Radius of curvature | Thickness/ distance | Refractive index | Abbe number |
|---|---|---|---|---|---|
| S1 | First lens | 3.1106 | 0.360 | 1.544 | 55.990 |
| S2 | | 3.2110 | 0.065 | | |
| S3 | Second lens | 3.0526 | 1.072 | 1.544 | 55.990 |
| S4 | | 52.9395 | 0.035 | | |
| S5 | Third lens | 15.3387 | 0.278 | 1.639 | 23.490 |
| S6 | | 4.5235 | 0.144 | | |
| S7 | Fourth lens | 5.2949 | 0.516 | 1.544 | 55.990 |
| S8 | | 10.4773 | 0.363 | | |
| S9 | Fifth lens | −11.0663 | 0.320 | 1.671 | 19.240 |
| S10 | | −11.2826 | 0.247 | | |
| S11 | Sixth lens | 28.9634 | 0.250 | 1.671 | 19.240 |
| S12 | | 15.1231 | 0.222 | | |
| S13 | Seventh lens | 92.6848 | 0.474 | 1.544 | 55.990 |
| S14 | | 21.6576 | 0.206 | | |
| S15 | Eighth lens | −7.2015 | 0.328 | 1.615 | 25.900 |
| S16 | | −8.3232 | 0.130 | | |
| S17 | Ninth lens | 2.3616 | 0.459 | 1.544 | 55.990 |
| S18 | | 4.4564 | 1.400 | | |
| S19 | Tenth lens | 31.5028 | 0.414 | 1.535 | 55.740 |
| S20 | | 3.2008 | 0.499 | | |
| S21 | Filter | Infinity | 0.210 | 1.517 | 64.200 |
| S22 | | Infinity | 0.226 | | |
| S23 | Imaging plane | Infinity | 0.002 | | |

TABLE 4

| Surface No. | S1 | S2 | S3 | S4 | S5 | S6 | S7 |
|---|---|---|---|---|---|---|---|
| K | −5.192E+00 | −1.119E+01 | −4.804E+00 | 9.900E+01 | 2.287E+01 | 4.570E+00 | −5.636E+00 |
| A | 1.243E−02 | 1.465E−02 | −3.425E−04 | 1.068E−02 | 1.362E−02 | −2.720E−03 | −1.732E−03 |
| B | 4.206E−03 | −3.932E−02 | −9.766E−03 | −4.697E−02 | −6.350E−02 | −3.311E−02 | −1.810E−04 |
| C | −3.435E−02 | 5.980E−02 | 2.030E−02 | 5.878E−02 | 8.899E−02 | 5.210E−02 | −6.403E−03 |
| D | 7.253E−02 | −5.880E−02 | −1.822E−02 | −4.123E−02 | −6.780E−02 | −4.136E−02 | 1.538E−02 |
| E | −8.991E−02 | 3.677E−02 | 9.939E−03 | 1.787E−02 | 3.181E−02 | 1.773E−02 | −1.580E−02 |
| F | 7.280E−02 | −1.377E−02 | −3.336E−03 | −4.901E−03 | −9.391E−03 | −3.395E−03 | 8.946E−03 |
| G | −4.059E−02 | 2.141E−03 | 6.705E−04 | 8.331E−04 | 1.704E−03 | −1.309E−04 | −2.833E−03 |
| H | 1.600E−02 | 6.319E−04 | −7.412E−05 | −8.065E−05 | −1.739E−04 | 1.587E−04 | 4.712E−04 |
| J | −4.500E−03 | −4.792E−04 | 3.464E−06 | 3.420E−06 | 7.661E−06 | −1.848E−05 | −3.204E−05 |
| L | 8.977E−04 | 1.421E−04 | 0.000E+00 | 0.000E+00 | 0.000E+00 | 0.000E+00 | 0.000E+00 |
| M | −1.240E−04 | −2.492E−05 | 0.000E+00 | 0.000E+00 | 0.000E+00 | 0.000E+00 | 0.000E+00 |
| N | 1.128E−05 | 2.683E−06 | 0.000E+00 | 0.000E+00 | 0.000E+00 | 0.000E+00 | 0.000E+00 |
| O | −6.074E−07 | −1.648E−07 | 0.000E+00 | 0.000E+00 | 0.000E+00 | 0.000E+00 | 0.000E+00 |
| P | 1.465E−08 | 4.441E−09 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.725E+01 | 1.215E+01 | 9.321E+00 | 4.549E+01 | −5.553E+01 | −9.900E+01 | 4.620E+01 |
| A | −1.010E−03 | 1.000E−02 | 2.151E−03 | −2.434E−02 | −2.970E−02 | −8.789E−02 | −1.146E−01 |
| B | −6.806E−04 | −7.277E−02 | −3.181E−03 | 3.189E−02 | −1.479E−02 | 5.746E−02 | 1.034E−01 |
| C | −1.636E−03 | 2.335E−01 | −2.640E−02 | −2.182E−01 | −1.320E−02 | −3.196E−02 | −1.465E−01 |
| D | 4.504E−03 | −4.877E−01 | 8.385E−02 | 5.866E−01 | 1.549E−01 | 3.333E−02 | 2.570E−01 |
| E | −4.630E−03 | 7.197E−01 | −8.595E−02 | −8.831E−01 | −3.218E−01 | −1.764E−02 | −3.222E−01 |
| F | 2.365E−03 | −7.831E−01 | −1.302E−02 | 8.252E−01 | 3.566E−01 | −3.997E−02 | 2.624E−01 |
| G | −5.440E−04 | 6.422E−01 | 1.250E−01 | −4.895E−01 | −2.507E−01 | 8.049E−02 | −1.441E−01 |
| H | 3.154E−05 | −3.996E−01 | −1.493E−01 | 1.741E−01 | 1.193E−01 | −6.858E−02 | 5.522E−02 |
| J | 3.931E−06 | 1.875E−01 | 9.821E−02 | −2.602E−02 | −3.944E−02 | 3.460E−02 | −1.504E−02 |
| L | 0.000E+00 | −6.510E−02 | −4.101E−02 | −6.114E−03 | 9.116E−03 | −1.122E−02 | 2.911E−03 |
| M | 0.000E+00 | 1.614E−02 | 1.115E−02 | 4.105E−03 | −1.454E−03 | 2.372E−03 | −3.922E−04 |
| N | 0.000E+00 | −2.689E−03 | −1.922E−03 | −9.446E−04 | 1.542E−04 | −3.171E−04 | 3.503E−05 |
| O | 0.000E+00 | 2.689E−04 | 1.910E−04 | 1.074E−04 | −9.915E−06 | 2.438E−05 | −1.866E−06 |
| P | 0.000E+00 | −1.217E−05 | −8.351E−06 | −5.030E−06 | 2.982E−07 | −8.219E−07 | 4.487E−08 |

| Surface No. | S15 | S16 | S17 | S18 | S19 | S20 |
|---|---|---|---|---|---|---|
| K | 4.093E+00 | 1.667E+00 | −6.788E+00 | −1.504E+01 | 2.675E+01 | −7.591E+00 |
| A | 2.938E−02 | 1.973E−02 | 1.246E−02 | 3.191E−02 | −5.820E−02 | −3.418E−02 |
| B | −3.782E−02 | −5.409E−02 | −4.089E−02 | −3.193E−02 | 9.762E−03 | 7.374E−03 |
| C | 2.324E−02 | 6.646E−02 | 4.075E−02 | 1.753E−02 | 1.853E−03 | −7.188E−04 |
| D | 4.070E−02 | −4.057E−02 | −2.713E−02 | −6.539E−03 | −1.663E−03 | −2.248E−06 |
| E | −8.904E−02 | 9.729E−03 | 1.286E−02 | 1.654E−03 | 5.263E−04 | −2.729E−06 |
| F | 7.696E−02 | 2.439E−03 | −4.492E−03 | −2.883E−04 | −1.012E−04 | 3.857E−06 |
| G | −3.931E−02 | −2.639E−03 | 1.166E−03 | 3.479E−05 | 1.303E−05 | −8.996E−07 |
| H | 1.324E−02 | 9.622E−04 | −2.245E−04 | −2.873E−06 | −1.166E−06 | 1.098E−07 |
| J | −3.069E−03 | −2.082E−04 | 3.175E−05 | 1.561E−07 | 7.361E−08 | −8.376E−09 |
| L | 4.954E−04 | 2.942E−05 | −3.242E−06 | −5.129E−09 | −3.270E−09 | 4.210E−10 |
| M | −5.488E−05 | −2.754E−06 | 2.317E−07 | 8.590E−11 | 1.002E−10 | −1.401E−11 |
| N | 3.988E−06 | 1.653E−07 | −1.097E−08 | −8.293E−13 | −2.017E−12 | 2.975E−13 |
| O | −1.714E−07 | −5.773E−09 | 3.082E−10 | 3.760E−14 | 2.403E−14 | −3.661E−15 |
| P | 3.305E−09 | 8.945E−11 | −3.887E−12 | −9.847E−16 | −1.285E−16 | 1.988E−17 |

Figure 5:
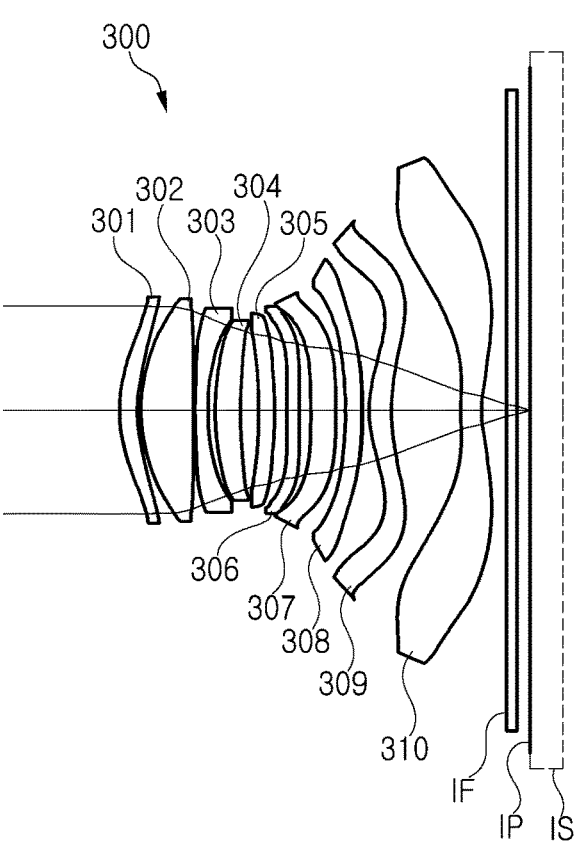
FIG. 5 is a configuration diagram of an imaging lens system according to a third embodiment.

An imaging lens system according to a third embodiment will be described with reference to FIG. 5.

An imaging lens system 300 includes a first lens 301, a second lens 302, a third lens 303, a fourth lens 304, a fifth lens 305, a sixth lens 306, a seventh lens 307, an eighth lens 308, a ninth lens 309, and a tenth lens 310.

The first lens 301 has positive refractive power, and has a convex object-side surface and a concave image-side surface. The second lens 302 has positive refractive power, and has a convex object-side surface and a concave image-side surface. The third lens 303 has negative refractive power, and has a convex object-side surface and a concave image-side surface. The fourth lens 304 has positive refractive power, and has a convex object-side surface and a concave image-side surface. The fifth lens 305 has negative refractive power, and has a concave object-side surface and a convex image-side surface. The sixth lens 306 has negative refractive power, and has a convex object-side surface and a concave image-side surface. In addition, an inflection point is formed on the object-side surface and the image-side surface of the sixth lens 306. The seventh lens 307 has negative refractive power, and has a convex object-side surface and a concave image-side surface. In addition, an inflection point is formed on the object-side surface and the image-side surface of the seventh lens 307. The eighth lens 308 has negative refractive power, and has a concave object-side surface and a convex image-side surface. In addition, an inflection point is formed on the object-side surface and the image-side surface of the eighth lens 308. The ninth lens 309 has positive refractive power, and has a convex object-side surface and a concave image-side surface. In addition, an inflection point is formed on the object-side surface and the image-side surface of the ninth lens 309. The tenth lens 310 has negative refractive power, and has a convex object-side surface and a concave image-side surface. In addition, an inflection point is formed on the object-side surface and the image-side surface of the tenth lens 310.

The imaging lens system 300 may further include a filter IF and an imaging plane IP. The filter IF may be disposed between the tenth lens 310 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 6:
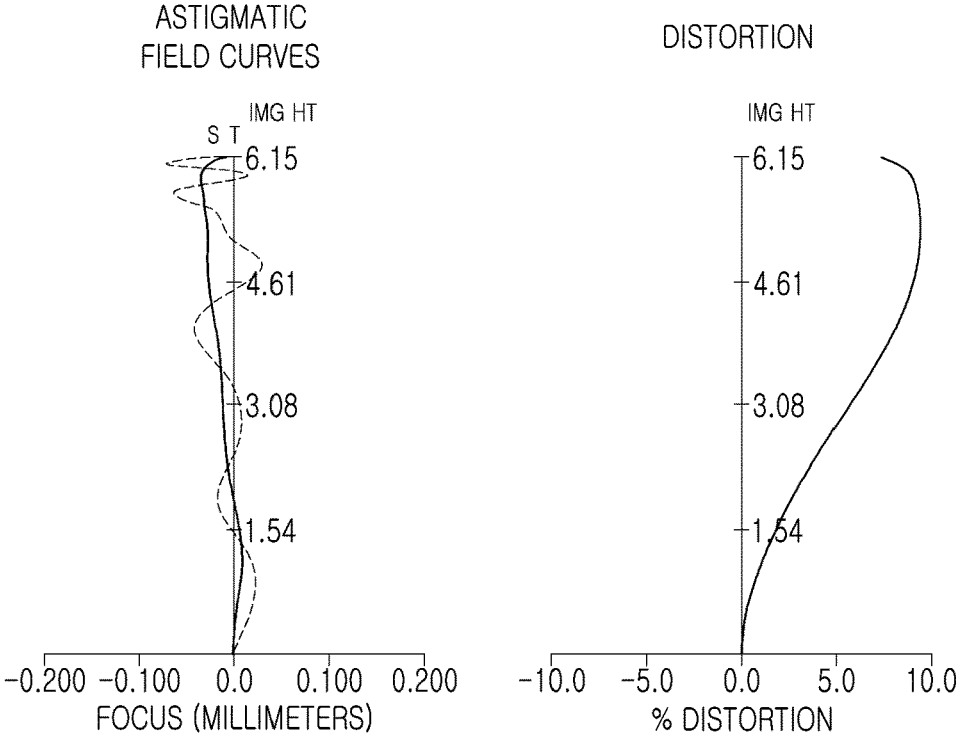
FIG. 6 shows aberration curves of the imaging lens system illustrated in FIG. 5.

Tables 5 and 6 illustrate lens characteristics and aspherical surface values of the imaging lens system according to the present embodiment. FIG. 6 shows aberration curves of the imaging lens system according to the present embodiment.

TABLE 5

| Surface No. | Components | Radius of curvature | Thickness/ distance | Refractive index | Abbe number |
|---|---|---|---|---|---|
| S1 | First lens | 3.1107 | 0.360 | 1.544 | 55.990 |
| S2 | | 3.2098 | 0.070 | | |
| S3 | Second lens | 3.0515 | 1.066 | 1.544 | 55.990 |
| S4 | | 51.1338 | 0.041 | | |
| S5 | Third lens | 15.1877 | 0.260 | 1.639 | 23.490 |
| S6 | | 4.5247 | 0.143 | | |

TABLE 5-continued

| Surface No. | Components | Radius of curvature | Thickness/ distance | Refractive index | Abbe number |
|---|---|---|---|---|---|
| S7 | Fourth lens | 5.2966 | 0.514 | 1.544 | 55.990 |
| S8 | | 10.4582 | 0.370 | | |
| S9 | Fifth lens | −11.0392 | 0.320 | 1.671 | 19.240 |
| S10 | | −11.2963 | 0.252 | | |
| S11 | Sixth lens | 29.6961 | 0.248 | 1.671 | 19.240 |
| S12 | | 15.1787 | 0.228 | | |
| S13 | Seventh lens | 99.8558 | 0.501 | 1.544 | 55.990 |
| S14 | | 22.7809 | 0.208 | | |
| S15 | Eighth lens | −7.1280 | 0.334 | 1.615 | 25.900 |
| S16 | | −8.2328 | 0.128 | | |
| S17 | Ninth lens | 2.4120 | 0.449 | 1.544 | 55.990 |
| S18 | | 4.5458 | 1.418 | | |
| S19 | Tenth lens | 32.5409 | 0.426 | 1.535 | 55.740 |
| S20 | | 3.1721 | 0.499 | | |
| S21 | Filter | Infinity | 0.210 | 1.517 | 64.200 |
| S22 | | Infinity | 0.239 | | |
| S23 | Imaging plane | Infinity | 0.002 | | |

TABLE 6

| Surface No. | S1 | S2 | S3 | S4 | S5 | S6 | S7 |
|---|---|---|---|---|---|---|---|
| K | −5.192E+00 | −1.117E+01 | −4.816E+00 | 9.900E+01 | 2.337E+01 | 4.569E+00 | −5.586E+00 |
| A | 1.222E−02 | 1.368E−02 | −4.295E−04 | 9.557E−03 | 1.276E−02 | −2.899E−03 | −1.547E−03 |
| B | 3.660E−03 | −3.465E−02 | −9.181E−03 | −4.269E−02 | −5.968E−02 | −3.226E−02 | −1.505E−03 |
| C | −3.044E−02 | 4.986E−02 | 1.936E−02 | 5.232E−02 | 8.293E−02 | 5.044E−02 | −2.454E−03 |
| D | 6.402E−02 | −4.632E−02 | −1.750E−02 | −3.607E−02 | −6.282E−02 | −4.009E−02 | 9.577E−03 |
| E | −7.990E−02 | 2.651E−02 | 9.601E−03 | 1.544E−02 | 2.943E−02 | 1.747E−02 | −1.089E−02 |
| F | 6.552E−02 | −7.898E−03 | −3.232E−03 | −4.199E−03 | −8.703E−03 | −3.610E−03 | 6.431E−03 |
| G | −3.718E−02 | −3.258E−04 | 6.499E−04 | 7.102E−04 | 1.585E−03 | 2.294E−05 | −2.063E−03 |
| H | 1.497E−02 | 1.436E−03 | −7.176E−05 | −6.863E−05 | −1.628E−04 | 1.202E−04 | 3.411E−04 |
| J | −4.317E−03 | −6.916E−04 | 3.347E−06 | 2.914E−06 | 7.220E−06 | −1.498E−05 | −2.272E−05 |
| L | 8.851E−04 | 1.878E−04 | 0.000E+00 | 0.000E+00 | 0.000E+00 | 0.000E+00 | 0.000E+00 |
| M | −1.260E−04 | −3.249E−05 | 0.000E+00 | 0.000E+00 | 0.000E+00 | 0.000E+00 | 0.000E+00 |
| N | 1.185E−05 | 3.564E−06 | 0.000E+00 | 0.000E+00 | 0.000E+00 | 0.000E+00 | 0.000E+00 |
| O | −6.614E−07 | −2.271E−07 | 0.000E+00 | 0.000E+00 | 0.000E+00 | 0.000E+00 | 0.000E+00 |
| P | 1.659E−08 | 6.426E−09 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.623E+01 | 1.208E+01 | 9.941E+00 | 3.889E+01 | −5.824E+01 | −9.900E+01 | 4.757E+01 |
| A | −1.472E−03 | 7.809E−03 | 3.460E−03 | −2.367E−02 | −3.235E−02 | −8.649E−02 | −1.094E−01 |
| B | 2.364E−04 | −5.930E−02 | −8.075E−03 | 3.246E−02 | −1.135E−03 | 6.022E−02 | 9.209E−02 |
| C | −1.802E−03 | 1.944E−01 | −1.121E−02 | −2.204E−01 | −5.141E−02 | −5.294E−02 | −1.246E−01 |
| D | 3.253E−03 | −4.289E−01 | 4.829E−02 | 5.876E−01 | 2.212E−01 | 8.228E−02 | 2.244E−01 |
| E | −2.792E−03 | 6.873E−01 | −2.960E−02 | −8.805E−01 | −4.011E−01 | −9.180E−02 | −2.888E−01 |
| F | 1.134E−03 | −8.229E−01 | −7.403E−02 | 8.207E−01 | 4.256E−01 | 4.020E−02 | 2.393E−01 |
| G | −1.008E−04 | 7.412E−01 | 1.709E−01 | −4.861E−01 | −2.953E−01 | 1.838E−02 | −1.331E−01 |
| H | −5.142E−05 | −5.003E−01 | −1.736E−01 | 1.728E−01 | 1.407E−01 | −3.420E−02 | 5.164E−02 |
| J | 1.027E−05 | 2.502E−01 | 1.072E−01 | −2.581E−02 | −4.708E−02 | 2.106E−02 | −1.425E−02 |
| L | 0.000E+00 | −9.094E−02 | −4.327E−02 | −6.064E−03 | 1.109E−02 | −7.471E−03 | 2.798E−03 |
| M | 0.000E+00 | 2.324E−02 | 1.153E−02 | 4.070E−03 | −1.815E−03 | 1.660E−03 | −3.829E−04 |
| N | 0.000E+00 | −3.945E−03 | −1.958E−03 | −9.366E−04 | 1.979E−04 | −2.287E−04 | 3.477E−05 |
| O | 0.000E+00 | 3.987E−04 | 1.926E−04 | 1.065E−04 | −1.308E−05 | 1.794E−05 | −1.883E−06 |
| P | 0.000E+00 | −1.811E−05 | −8.359E−06 | −4.988E−06 | 4.013E−07 | −6.132E−07 | 4.604E−08 |

| Surface No. | S15 | S16 | S17 | S18 | S19 | S20 |
|---|---|---|---|---|---|---|
| K | 4.250E+00 | 1.617E+00 | −6.864E+00 | −1.529E+01 | 2.406E+01 | −7.673E+00 |
| A | 2.676E−02 | 1.495E−02 | 8.488E−03 | 2.900E−02 | −6.161E−02 | −3.858E−02 |
| B | −3.727E−02 | −4.290E−02 | −3.257E−02 | −2.661E−02 | 1.602E−02 | 1.246E−02 |
| C | 3.393E−02 | 5.413E−02 | 3.198E−02 | 1.273E−02 | −1.982E−03 | −3.205E−03 |
| D | 1.856E−02 | −3.212E−02 | −2.164E−02 | −4.053E−03 | −3.340E−04 | 7.180E−04 |
| E | −6.503E−02 | 5.976E−03 | 1.055E−02 | 8.067E−04 | 2.232E−04 | −1.414E−04 |
| F | 6.010E−02 | 3.452E−03 | −3.796E−03 | −8.455E−05 | −5.268E−05 | 2.255E−05 |
| G | −3.115E−02 | −2.758E−03 | 1.014E−03 | −9.446E−07 | 7.439E−06 | −2.712E−06 |
| H | 1.045E−02 | 9.431E−04 | −2.001E−04 | 1.764E−06 | −6.977E−07 | 2.375E−07 |
| J | −2.393E−03 | −1.974E−04 | 2.894E−05 | −2.881E−07 | 4.509E−08 | −1.492E−08 |
| L | 3.793E−04 | 2.724E−05 | −3.013E−06 | 2.582E−08 | −2.023E−09 | 6.622E−10 |
| M | −4.112E−05 | −2.500E−06 | 2.192E−07 | −1.434E−09 | 6.211E−11 | −2.022E−11 |
| N | 2.917E−06 | 1.474E−07 | −1.055E−08 | 4.890E−11 | −1.246E−12 | 4.038E−13 |
| O | −1.221E−07 | −5.063E−09 | 3.010E−10 | −9.315E−13 | 1.475E−14 | −4.742E−15 |
| P | 2.290E−09 | 7.718E−11 | −3.851E−12 | 7.500E−15 | −7.816E−17 | 2.483E−17 |

Figure 7:
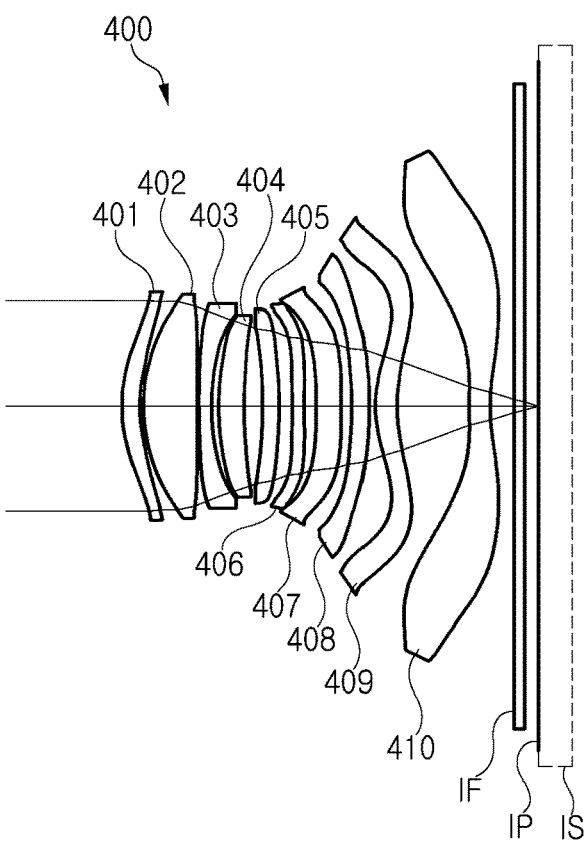
FIG. 7 is a configuration diagram of an imaging lens system according to a fourth embodiment.

An imaging lens system according to a fourth embodiment will be described with reference to FIG. 7.

An imaging lens system 400 includes a first lens 401, a second lens 402, a third lens 403, a fourth lens 404, a fifth lens 405, a sixth lens 406, a seventh lens 407, an eighth lens 408, a ninth lens 409, and a tenth lens 410.

The first lens 401 has positive refractive power, and has a convex object-side surface and a concave image-side surface. The second lens 402 has positive refractive power, and has a convex object-side surface and a concave image-side surface. The third lens 403 has negative refractive power, and has a convex object-side surface and a concave image-side surface. The fourth lens 404 has positive refractive power, and has a convex object-side surface and a concave image-side surface. The fifth lens 405 has negative refractive power, and has a concave object-side surface and a convex image-side surface. The sixth lens 406 has negative refractive power, and has a convex object-side surface and a concave image-side surface. In addition, an inflection point is formed on the object-side surface and the image-side surface of the sixth lens 406. The seventh lens 407 has negative refractive power, and has a convex object-side surface and a concave image-side surface. In addition, an inflection point is formed on the object-side surface and the image-side surface of the seventh lens 407. The eighth lens 408 has negative refractive power, and has a concave object-side surface and a convex image-side surface. In addition, an inflection point is formed on the object-side surface and the image-side surface of the eighth lens 408. The ninth lens 409 has positive refractive power, and has a convex object-side surface and a concave image-side surface. In addition, an inflection point is formed on the object-side surface and the image-side surface of the ninth lens 409. The tenth lens 410 has negative refractive power, and has a convex object-side surface and a concave image-side surface. In addition, an inflection point is formed on the object-side surface and the image-side surface of the tenth lens 410.

The imaging lens system 400 may further include a filter IF and an imaging plane IP. The filter IF may be disposed between the tenth lens 410 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 8:
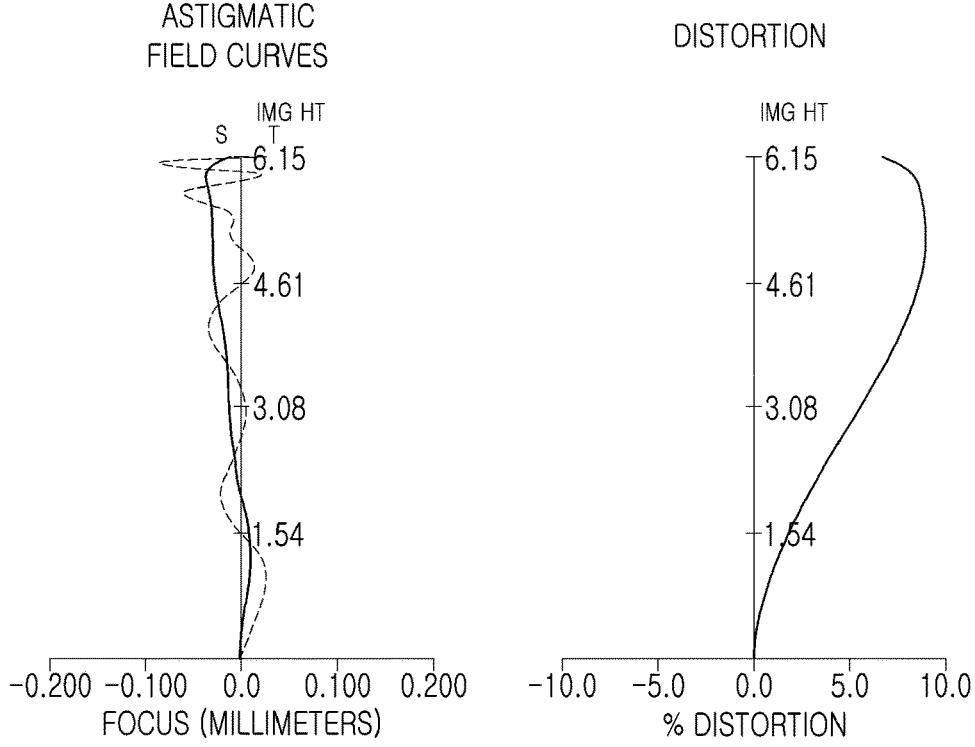
FIG. 8 shows aberration curves of the imaging lens system illustrated in FIG. 7.

Tables 7 and 8 illustrate lens characteristics and aspherical surface values of the imaging lens system according to the present embodiment. FIG. 8 shows aberration curves of the imaging lens system according to the present embodiment.

TABLE 7

| Surface No. | Components | Radius of curvature | Thickness/ distance | Refractive index | Abbe number |
|---|---|---|---|---|---|
| S1 | First lens | 3.1109 | 0.361 | 1.544 | 55.990 |
| S2 | | 3.2073 | 0.071 | | |
| S3 | Second lens | 3.0490 | 1.062 | 1.544 | 55.990 |
| S4 | | 50.2024 | 0.044 | | |
| S5 | Third lens | 15.1048 | 0.250 | 1.639 | 23.490 |
| S6 | | 4.5244 | 0.144 | | |
| S7 | Fourth lens | 5.2946 | 0.513 | 1.544 | 55.990 |
| S8 | | 10.4367 | 0.373 | | |
| S9 | Fifth lens | −11.0119 | 0.324 | 1.671 | 19.240 |
| S10 | | −11.1637 | 0.256 | | |
| S11 | Sixth lens | 30.5047 | 0.246 | 1.671 | 19.240 |
| S12 | | 15.2875 | 0.233 | | |
| S13 | Seventh lens | 111.2031 | 0.514 | 1.544 | 55.990 |
| S14 | | 22.7434 | 0.210 | | |
| S15 | Eighth lens | −7.1860 | 0.341 | 1.615 | 25.900 |
| S16 | | −8.2644 | 0.123 | | |
| S17 | Ninth lens | 2.4303 | 0.446 | 1.544 | 55.990 |
| S18 | | 4.5365 | 1.427 | | |
| S19 | Tenth lens | 34.3514 | 0.413 | 1.535 | 55.740 |
| S20 | | 3.1854 | 0.499 | | |
| S21 | Filter | Infinity | 0.210 | 1.517 | 64.200 |
| S22 | | Infinity | 0.257 | | |
| S23 | Imaging plane | Infinity | 0.002 | | |

TABLE 8

| Surface No. | S1 | S2 | S3 | S4 | S5 | S6 | S7 |
|---|---|---|---|---|---|---|---|
| K | −5.196E+00 | −1.115E+01 | −4.817E+00 | 9.900E+01 | 2.329E+01 | 4.568E+00 | −5.546E+00 |
| A | 1.239E−02 | 1.386E−02 | −4.962E−04 | 8.494E−03 | 1.162E−02 | −3.499E−03 | −2.292E−03 |
| B | 1.619E−03 | −3.807E−02 | −8.907E−03 | −3.884E−02 | −5.512E−02 | −2.960E−02 | 1.027E−03 |
| C | −2.373E−02 | 6.525E−02 | 1.886E−02 | 4.676E−02 | 7.583E−02 | 4.633E−02 | −6.188E−03 |
| D | 5.275E−02 | −8.065E−02 | −1.696E−02 | −3.174E−02 | −5.705E−02 | −3.771E−02 | 1.247E−02 |
| E | −6.849E−02 | 7.290E−02 | 9.257E−03 | 1.343E−02 | 2.672E−02 | 1.773E−02 | −1.194E−02 |
| F | 5.812E−02 | −4.938E−02 | −3.099E−03 | −3.622E−03 | −7.953E−03 | −4.626E−03 | 6.430E−03 |
| G | −3.406E−02 | 2.539E−02 | 6.196E−04 | 6.095E−04 | 1.467E−03 | 5.405E−04 | −1.932E−03 |
| H | 1.416E−02 | −9.875E−03 | −6.806E−05 | −5.876E−05 | −1.532E−04 | 6.514E−06 | 3.010E−04 |
| J | −4.214E−03 | 2.870E−03 | 3.160E−06 | 2.494E−06 | 6.948E−06 | −5.443E−06 | −1.878E−05 |
| L | 8.924E−04 | −6.100E−04 | 0.000E+00 | 0.000E+00 | 0.000E+00 | 0.000E+00 | 0.000E+00 |
| M | −1.314E−04 | 9.167E−05 | 0.000E+00 | 0.000E+00 | 0.000E+00 | 0.000E+00 | 0.000E+00 |
| N | 1.278E−05 | −9.204E−06 | 0.000E+00 | 0.000E+00 | 0.000E+00 | 0.000E+00 | 0.000E+00 |
| O | −7.383E−07 | 5.529E−07 | 0.000E+00 | 0.000E+00 | 0.000E+00 | 0.000E+00 | 0.000E+00 |
| P | 1.920E−08 | −1.501E−08 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.617E+01 | 1.185E+01 | 1.011E+01 | 3.619E+01 | −5.902E+01 | −9.900E+01 | 5.346E+01 |
| A | −2.462E−03 | 1.045E−02 | 8.445E−03 | −2.375E−02 | −3.272E−02 | −8.417E−02 | −1.062E−01 |
| B | 3.504E−03 | −8.296E−02 | −4.684E−02 | 2.925E−02 | −6.785E−03 | 4.359E−02 | 7.406E−02 |
| C | −8.108E−03 | 3.021E−01 | 1.427E−01 | −1.969E−01 | −1.047E−02 | 9.470E−03 | −7.172E−02 |
| D | 1.112E−02 | −7.356E−01 | −3.231E−01 | 5.226E−01 | 1.070E−01 | −4.867E−02 | 1.397E−01 |
| E | −9.035E−03 | 1.273E+00 | 5.600E−01 | −7.821E−01 | −2.193E−01 | 7.741E−02 | −2.064E−01 |
| F | 4.261E−03 | −1.602E+00 | −7.190E−01 | 7.295E−01 | 2.380E−01 | −1.044E−01 | 1.870E−01 |
| G | −1.058E−03 | 1.481E+00 | 6.708E−01 | −4.335E−01 | −1.621E−01 | 1.036E−01 | −1.106E−01 |

TABLE 8-continued

| | | | | | | | |
|---|---|---|---|---|---|---|---|
| H | 1.118E-04 | -1.008E+00 | -4.520E-01 | 1.553E-01 | 7.358E-02 | -6.968E-02 | 4.504E-02 |
| J | -1.543E-06 | 5.024E-01 | 2.189E-01 | -2.400E-02 | -2.279E-02 | 3.156E-02 | -1.294E-02 |
| L | 0.000E+00 | -1.808E-01 | -7.533E-02 | -5.012E-03 | 4.819E-03 | -9.659E-03 | 2.631E-03 |
| M | 0.000E+00 | 4.561E-02 | 1.793E-02 | 3.537E-03 | -6.821E-04 | 1.974E-03 | -3.712E-04 |
| N | 0.000E+00 | -7.642E-03 | -2.806E-03 | -8.225E-04 | 6.200E-05 | -2.582E-04 | 3.461E-05 |
| O | 0.000E+00 | 7.628E-04 | 2.594E-04 | 9.407E-05 | -3.339E-06 | 1.956E-05 | -1.918E-06 |
| P | 0.000E+00 | -3.429E-05 | -1.073E-05 | -4.423E-06 | 8.558E-08 | -6.526E-07 | 4.781E-08 |

| Surface No. | S15 | S16 | S17 | S18 | S19 | S20 |
|---|---|---|---|---|---|---|
| K | 4.335E+00 | 1.582E+00 | -6.942E+00 | -1.480E+01 | 3.468E+01 | -7.583E+00 |
| A | 2.724E-02 | 1.255E-02 | 6.433E-03 | 2.795E-02 | -6.267E-02 | -4.057E-02 |
| B | -4.945E-02 | -3.892E-02 | -2.766E-02 | -2.581E-02 | 1.686E-02 | 1.356E-02 |
| C | 7.651E-02 | 5.663E-02 | 2.644E-02 | 1.281E-02 | -2.409E-03 | -3.614E-03 |
| D | -4.957E-02 | -4.273E-02 | -1.781E-02 | -4.604E-03 | -1.665E-04 | 8.164E-04 |
| E | -1.683E-03 | 1.714E-02 | 8.630E-03 | 1.208E-03 | 1.778E-04 | -1.567E-04 |
| F | 2.200E-02 | -3.034E-03 | -3.065E-03 | -2.378E-04 | -4.448E-05 | 2.409E-05 |
| G | -1.547E-02 | -3.335E-04 | 8.033E-04 | 3.599E-05 | 6.438E-06 | -2.810E-06 |
| H | 5.903E-03 | 3.246E-04 | -1.555E-04 | -4.262E-06 | -6.133E-07 | 2.413E-07 |
| J | -1.452E-03 | -8.704E-05 | 2.211E-05 | 3.966E-07 | 4.010E-08 | -1.499E-08 |
| L | 2.410E-04 | 1.345E-05 | -2.275E-06 | -2.860E-08 | -1.818E-09 | 6.615E-10 |
| M | -2.700E-05 | -1.315E-06 | 1.643E-07 | 1.541E-09 | 5.629E-11 | -2.016E-11 |
| N | 1.964E-06 | 8.065E-08 | -7.883E-09 | -5.780E-11 | -1.139E-12 | 4.027E-13 |
| O | -8.391E-08 | -2.844E-09 | 2.252E-10 | 1.331E-12 | 1.358E-14 | -4.737E-15 |
| P | 1.598E-09 | 4.414E-11 | -2.892E-12 | -1.402E-14 | -7.247E-17 | 2.486E-17 |

Figure 9:
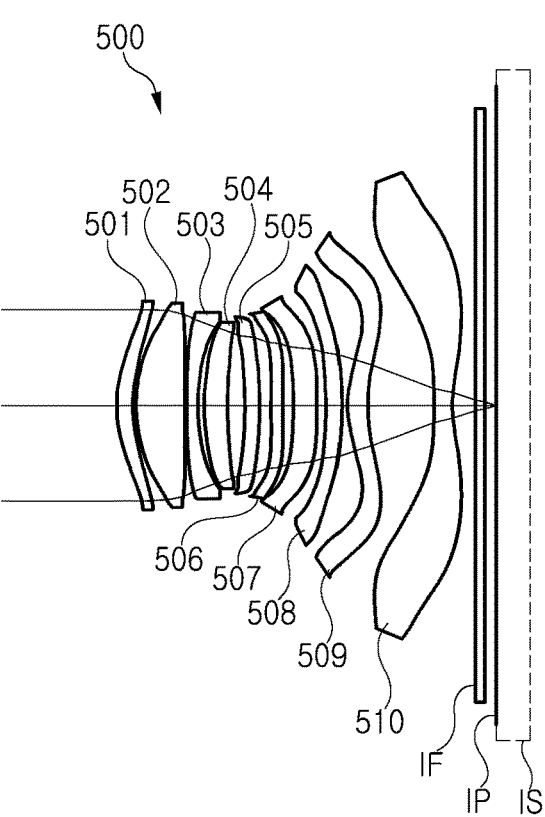
FIG. 9 is a configuration diagram of an imaging lens system according to a fifth embodiment.

An imaging lens system according to a fifth embodiment will be described with reference to FIG. 9.

An imaging lens system 500 includes a first lens 501, a second lens 502, a third lens 503, a fourth lens 504, a fifth lens 505, a sixth lens 506, a seventh lens 507, an eighth lens 508, a ninth lens 509, and a tenth lens 510.

The first lens 501 has positive refractive power, and has a convex object-side surface and a concave image-side surface. The second lens 502 has positive refractive power, and has a convex object-side surface and a concave image-side surface. The third lens 503 has negative refractive power, and has a convex object-side surface and a concave image-side surface. The fourth lens 504 has positive refractive power, and has a convex object-side surface and a concave image-side surface. The fifth lens 505 has positive refractive power, and has a concave object-side surface and a convex image-side surface. The sixth lens 506 has negative refractive power, and has a convex object-side surface and a concave image-side surface. In addition, an inflection point is formed on the object-side surface and the image-side surface of the sixth lens 506. The seventh lens 507 has negative refractive power, and has a convex object-side surface and a concave image-side surface. In addition, an inflection point is formed on the object-side surface and the image-side surface of the seventh lens 507. The eighth lens 508 has negative refractive power, and has a concave object-side surface and a convex image-side surface. In addition, an inflection point is formed on the object-side surface and the image-side surface of the eighth lens 508. The ninth lens 509 has positive refractive power, and has a convex object-side surface and a concave image-side surface. In addition, an inflection point is formed on the object-side surface and the image-side surface of the ninth lens 509. The tenth lens 510 has negative refractive power, and has a convex object-side surface and a concave image-side surface. In addition, an inflection point is formed on the object-side surface and the image-side surface of the tenth lens 510.

The imaging lens system 500 may further include a filter IF and an imaging plane IP. The filter IF may be disposed between the tenth lens 510 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 10:
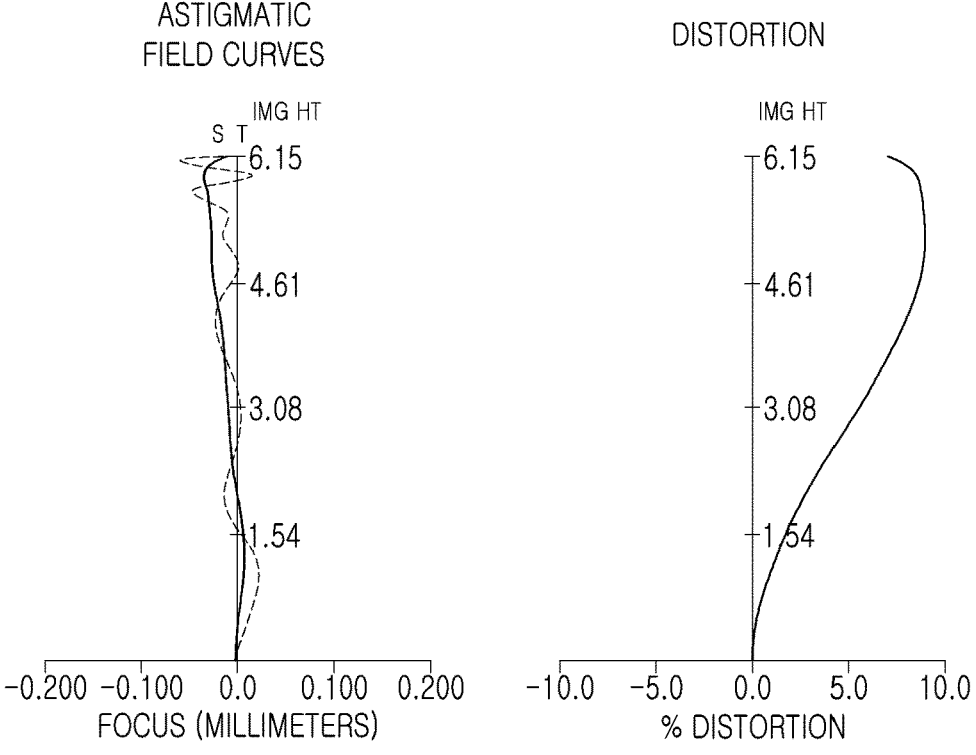
FIG. 10 shows aberration curves of the imaging lens system illustrated in FIG. 9.

Tables 9 and 10 illustrate lens characteristics and aspherical surface values of the imaging lens system according to the present embodiment. FIG. 10 shows aberration curves of the imaging lens system according to the present embodiment.

TABLE 9

| Surface No. | Components | Radius of curvature | Thickness/ distance | Refractive index | Abbe number |
|---|---|---|---|---|---|
| S1 | First lens | 3.1109 | 0.360 | 1.544 | 55.990 |
| S2 | | 3.2073 | 0.072 | | |
| S3 | Second lens | 3.0490 | 1.061 | 1.544 | 55.990 |
| S4 | | 50.6336 | 0.043 | | |
| S5 | Third lens | 15.1447 | 0.247 | 1.639 | 23.490 |
| S6 | | 4.5247 | 0.145 | | |
| S7 | Fourth lens | 5.2820 | 0.510 | 1.544 | 55.990 |
| S8 | | 10.3898 | 0.374 | | |
| S9 | Fifth lens | -11.0563 | 0.320 | 1.671 | 19.240 |
| S10 | | -11.1488 | 0.256 | | |
| S11 | Sixth lens | 30.5071 | 0.247 | 1.671 | 19.240 |
| S12 | | 15.1048 | 0.233 | | |
| S13 | Seventh lens | 99.2285 | 0.517 | 1.544 | 55.990 |
| S14 | | 22.5627 | 0.209 | | |
| S15 | Eighth lens | -7.1071 | 0.339 | 1.615 | 25.900 |
| S16 | | -8.1776 | 0.126 | | |
| S17 | Ninth lens | 2.4293 | 0.448 | 1.544 | 55.990 |
| S18 | | 4.5344 | 1.436 | | |
| S19 | Tenth lens | 34.2393 | 0.420 | 1.535 | 55.740 |
| S20 | | 3.1726 | 0.499 | | |
| S21 | Filter | Infinity | 0.210 | 1.517 | 64.200 |
| S22 | | Infinity | 0.238 | | |
| S23 | Imaging plane | Infinity | 0.002 | | |

TABLE 10

| Surface No. | S1 | S2 | S3 | S4 | S5 | S6 | S7 |
|---|---|---|---|---|---|---|---|
| K | −5.198E+00 | −1.114E+01 | −4.818E+00 | 9.900E+01 | 2.335E+01 | 4.568E+00 | −5.552E+00 |
| A | 1.241E-02 | 1.269E-02 | −1.381E-03 | 7.665E-03 | 1.022E-02 | −4.119E-03 | −2.424E-03 |
| B | 4.866E-04 | −3.369E-02 | −5.416E-03 | −3.623E-02 | −5.000E-02 | −2.750E-02 | 1.832E-03 |
| C | −1.882E-02 | 5.950E-02 | 1.326E-02 | 4.354E-02 | 6.855E-02 | 4.483E-02 | −7.244E-03 |
| D | 4.307E-02 | −7.936E-02 | −1.208E-02 | −2.970E-02 | −5.165E-02 | −3.996E-02 | 1.229E-02 |
| E | −5.744E-02 | 7.847E-02 | 6.696E-03 | 1.271E-02 | 2.446E-02 | 2.231E-02 | −1.056E-02 |
| F | 5.008E-02 | −5.791E-02 | −2.271E-03 | −3.482E-03 | −7.424E-03 | −7.957E-03 | 5.232E-03 |
| G | −3.018E-02 | 3.204E-02 | 4.584E-04 | 5.963E-04 | 1.407E-03 | 1.777E-03 | −1.449E-03 |
| H | 1.290E-02 | −1.324E-02 | −5.074E-05 | −5.848E-05 | −1.520E-04 | −2.277E-04 | 2.044E-04 |
| J | −3.952E-03 | 4.042E-03 | 2.372E-06 | 2.519E-06 | 7.157E-06 | 1.254E-05 | −1.106E-05 |
| L | 8.612E-04 | −8.954E-04 | 0.000E+00 | 0.000E+00 | 0.000E+00 | 0.000E+00 | 0.000E+00 |
| M | −1.304E-04 | 1.395E-04 | 0.000E+00 | 0.000E+00 | 0.000E+00 | 0.000E+00 | 0.000E+00 |
| N | 1.305E-05 | −1.448E-05 | 0.000E+00 | 0.000E+00 | 0.000E+00 | 0.000E+00 | 0.000E+00 |
| O | −7.762E-07 | 8.971E-07 | 0.000E+00 | 0.000E+00 | 0.000E+00 | 0.000E+00 | 0.000E+00 |
| P | 2.077E-08 | −2.508E-08 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.598E+01 | 1.183E+01 | 1.025E+01 | 3.385E+01 | −5.885E+01 | −9.851E+01 | 5.352E+01 |
| A | −2.263E-03 | 1.006E-02 | 9.806E-03 | −2.330E-02 | −3.688E-02 | −8.528E-02 | −1.072E-01 |
| B | 3.059E-03 | −8.042E-02 | −5.524E-02 | 1.712E-02 | 1.035E-02 | 4.569E-02 | 7.841E-02 |
| C | −7.176E-03 | 2.983E-01 | 1.759E-01 | −1.262E-01 | −3.779E-02 | 2.787E-02 | −7.397E-02 |
| D | 9.628E-03 | −7.419E-01 | −4.067E-01 | 3.332E-01 | 1.242E-01 | −1.238E-01 | 1.282E-01 |
| E | −7.646E-03 | 1.308E+00 | 7.013E-01 | −4.889E-01 | −2.156E-01 | 2.097E-01 | −1.807E-01 |
| F | 3.530E-03 | −1.673E+00 | −8.884E-01 | 4.410E-01 | 2.260E-01 | −2.437E-01 | 1.604E-01 |
| G | −8.446E-04 | 1.569E+00 | 8.196E-01 | −2.456E-01 | −1.560E-01 | 2.010E-01 | −9.360E-02 |
| H | 7.978E-05 | −1.081E+00 | −5.493E-01 | 7.392E-02 | 7.423E-02 | −1.170E-01 | 3.772E-02 |
| J | 3.280E-07 | 5.457E-01 | 2.661E-01 | −1.443E-03 | −2.496E-02 | 4.778E-02 | −1.075E-02 |
| L | 0.000E+00 | −1.988E-01 | −9.204E-02 | −8.447E-03 | 5.972E-03 | −1.359E-02 | 2.175E-03 |
| M | 0.000E+00 | 5.081E-02 | 2.212E-02 | 3.603E-03 | −1.008E-03 | 2.630E-03 | −3.061E-04 |
| N | 0.000E+00 | −8.629E-03 | −3.504E-03 | −7.485E-04 | 1.158E-04 | −3.303E-04 | 2.854E-05 |
| O | 0.000E+00 | 8.736E-04 | 3.288E-04 | 8.177E-05 | −8.254E-06 | 2.425E-05 | −1.584E-06 |
| P | 0.000E+00 | −3.987E-05 | −1.384E-05 | −3.760E-06 | 2.783E-07 | −7.893E-07 | 3.962E-08 |

| Surface No. | S15 | S16 | S17 | S18 | S19 | S20 |
|---|---|---|---|---|---|---|
| K | 4.353E+00 | 1.691E+00 | −6.938E+00 | −1.491E+01 | 3.502E+01 | −7.451E+00 |
| A | 2.508E-02 | 1.133E-02 | 5.582E-03 | 2.751E-02 | −6.221E-02 | −4.080E-02 |
| B | −4.124E-02 | −3.405E-02 | −2.598E-02 | −2.558E-02 | 1.738E-02 | 1.431E-02 |
| C | 6.256E-02 | 4.761E-02 | 2.464E-02 | 1.300E-02 | −3.022E-03 | −4.019E-03 |
| D | −3.719E-02 | −3.276E-02 | −1.643E-02 | −4.890E-03 | 1.137E-04 | 9.223E-04 |
| E | −7.021E-03 | 9.943E-03 | 7.857E-03 | 1.370E-03 | 1.025E-04 | −1.710E-04 |
| F | 2.200E-02 | 5.174E-04 | −2.755E-03 | −2.922E-04 | −3.117E-05 | 2.470E-05 |
| G | −1.414E-02 | −1.563E-03 | 7.148E-04 | 4.814E-05 | 4.805E-06 | −2.699E-06 |
| H | 5.105E-03 | 6.278E-04 | −1.375E-04 | −6.166E-06 | −4.709E-07 | 2.187E-07 |
| J | −1.191E-03 | −1.405E-04 | 1.948E-05 | 6.102E-07 | 3.120E-08 | −1.294E-08 |
| L | 1.871E-04 | 2.012E-05 | −2.002E-06 | −4.576E-08 | −1.422E-09 | 5.483E-10 |
| M | −1.971E-05 | −1.891E-06 | 1.447E-07 | 2.504E-09 | 4.405E-11 | −1.615E-11 |
| N | 1.339E-06 | 1.133E-07 | −6.955E-09 | −9.373E-11 | −8.886E-13 | 3.134E-13 |
| O | −5.295E-08 | −3.942E-09 | 1.991E-10 | 2.129E-12 | 1.054E-14 | −3.594E-15 |
| P | 9.239E-10 | 6.064E-11 | −2.562E-12 | −2.200E-14 | −5.587E-17 | 1.844E-17 |

Figure 11:
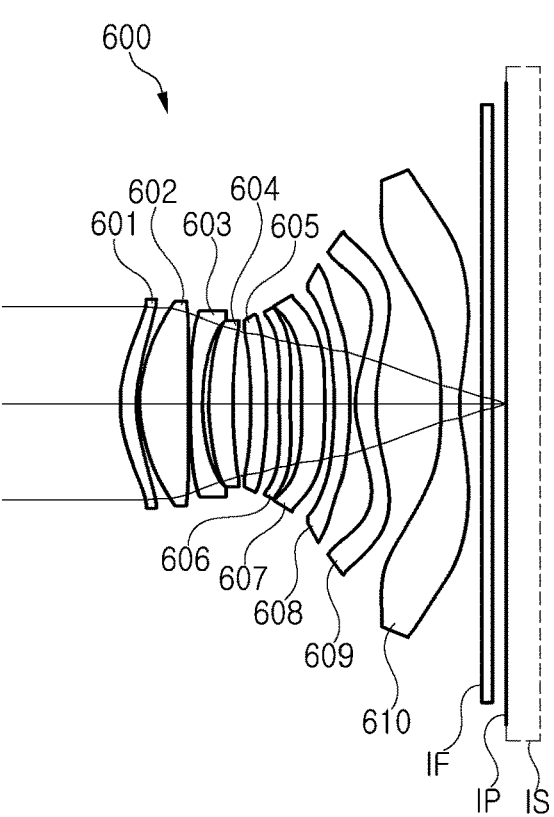
FIG. 11 is a configuration diagram of an imaging lens system according to a sixth embodiment.

An imaging lens system according to a sixth embodiment will be described with reference to FIG. 11.

An imaging lens system 600 includes a first lens 601, a second lens 602, a third lens 603, a fourth lens 604, a fifth lens 605, a sixth lens 606, a seventh lens 607, an eighth lens 608, a ninth lens 609, and a tenth lens 610.

The first lens 601 has positive refractive power, and has a convex object-side surface and a concave image-side surface. The second lens 602 has positive refractive power, and has a convex object-side surface and a concave image-side surface. The third lens 603 has negative refractive power, and has a convex object-side surface and a concave image-side surface. The fourth lens 604 has positive refractive power, and has a convex object-side surface and a concave image-side surface. The fifth lens 605 has positive refractive power, and has a concave object-side surface and a convex image-side surface. The sixth lens 606 has negative refractive power, and has a convex object-side surface and a concave image-side surface. In addition, an inflection point is formed on the object-side surface and the image-side surface of the sixth lens 606. The seventh lens 607 has negative refractive power, and has a convex object-side surface and a concave image-side surface. In addition, an inflection point is formed on the object-side surface and the image-side surface of the seventh lens 607. The eighth lens 608 has negative refractive power, and has a concave object-side surface and a convex image-side surface. In addition, an inflection point is formed on the object-side surface and the image-side surface of the eighth lens 608. The ninth lens 609 has positive refractive power, and has a convex object-side surface and a concave image-side surface. In addition, an inflection point is formed on the object-side surface and the image-side surface of the ninth lens 609. The tenth lens 610 has negative refractive power, and has a convex object-side surface and a concave image-side surface. In addition, an inflection point is formed on the object-side surface and the image-side surface of the tenth lens 610.

The imaging lens system 600 may further include a filter IF and an imaging plane IP. The filter IF may be disposed between the tenth lens 610 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 12:
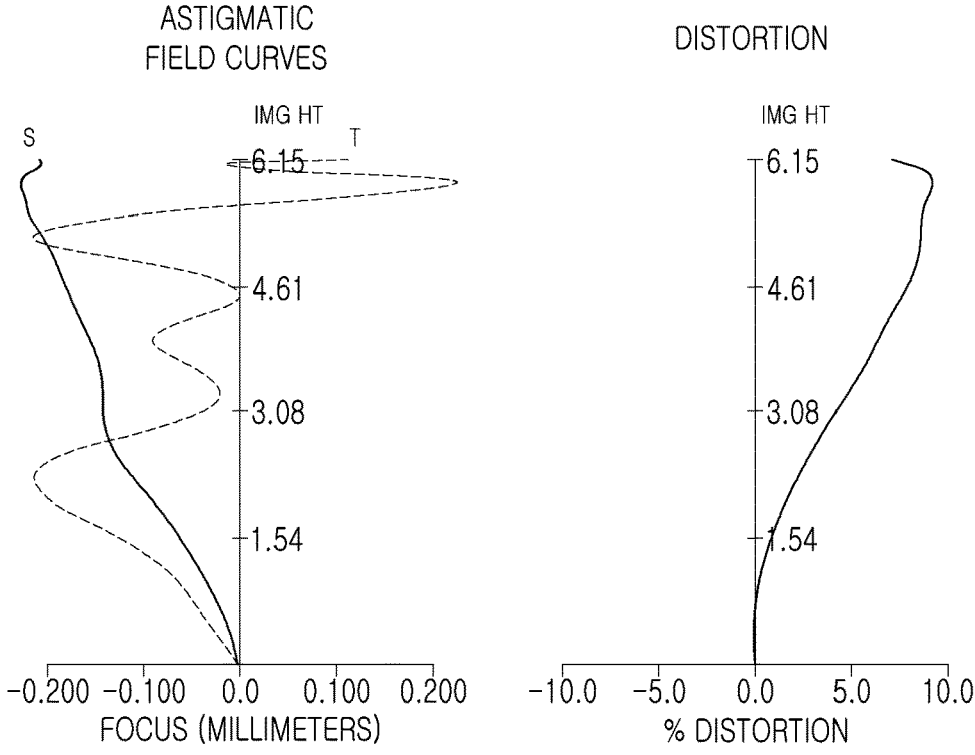
FIG. 12 shows aberration curves of the imaging lens system illustrated in FIG. 11.

Tables 11 and 12 illustrate lens characteristics and aspherical surface values of the imaging lens system according to the present embodiment. FIG. 12 shows aberration curves of the imaging lens system according to the present embodiment.

TABLE 11

| Surface No. | Components | Radius of curvature | Thickness/ distance | Refractive index | Abbe number |
|---|---|---|---|---|---|
| S1 | First lens | 3.1134 | 0.361 | 1.544 | 55.990 |
| S2 | | 3.1920 | 0.078 | | |
| S3 | Second lens | 3.0374 | 1.060 | 1.544 | 55.990 |
| S4 | | 47.5773 | 0.045 | | |
| S5 | Third lens | 14.9398 | 0.261 | 1.639 | 23.490 |

TABLE 11-continued

| Surface No. | Components | Radius of curvature | Thickness/ distance | Refractive index | Abbe number |
|---|---|---|---|---|---|
| S6 | | 4.5477 | 0.147 | | |
| S7 | Fourth lens | 5.2865 | 0.528 | 1.544 | 55.990 |
| S8 | | 10.2439 | 0.393 | | |
| S9 | Fifth lens | −11.6003 | 0.343 | 1.671 | 19.240 |
| S10 | | −11.4474 | 0.275 | | |
| S11 | Sixth lens | 26.5054 | 0.241 | 1.671 | 19.240 |
| S12 | | 13.5288 | 0.248 | | |
| S13 | Seventh lens | 58.8773 | 0.505 | 1.544 | 55.990 |
| S14 | | 20.3278 | 0.210 | | |
| S15 | Eighth lens | −7.4055 | 0.333 | 1.615 | 25.900 |
| S16 | | −8.4402 | 0.128 | | |
| S17 | Ninth lens | 2.4856 | 0.447 | 1.544 | 55.990 |
| S18 | | 4.6004 | 1.419 | | |
| S19 | Tenth lens | 34.9519 | 0.408 | 1.535 | 55.740 |
| S20 | | 3.2605 | 0.499 | | |
| S21 | Filter | Infinity | 0.210 | 1.517 | 64.200 |
| S22 | | Infinity | 0.203 | | |
| S23 | Imaging plane | Infinity | 0.002 | | |

TABLE 12

| Surface No. | S1 | S2 | S3 | S4 | S5 | S6 | S7 |
|---|---|---|---|---|---|---|---|
| K | −5.156E+00 | −1.123E+01 | −4.768E+00 | 9.900E+01 | 2.458E+01 | 4.552E+00 | −5.317E+00 |
| A | 1.128E−02 | 1.324E−02 | 1.637E−04 | 7.994E−03 | 8.914E−03 | −2.317E−03 | −2.191E−03 |
| B | −2.912E−03 | −4.255E−02 | −9.931E−03 | −3.377E−02 | −4.066E−02 | −2.769E−02 | 2.049E−03 |
| C | −5.214E−03 | 9.730E−02 | 1.825E−02 | 3.936E−02 | 5.226E−02 | 4.488E−02 | −6.949E−03 |
| D | 1.356E−02 | −1.628E−01 | −1.485E−02 | −2.616E−02 | −3.705E−02 | −4.087E−02 | 1.062E−02 |
| E | −1.519E−02 | 1.918E−01 | 7.229E−03 | 1.090E−02 | 1.653E−02 | 2.390E−02 | −8.470E−03 |
| F | 9.267E−03 | −1.599E−01 | −2.148E−03 | −2.899E−03 | −4.722E−03 | −9.229E−03 | 3.982E−03 |
| G | −2.924E−03 | 9.523E−02 | 3.809E−04 | 4.793E−04 | 8.396E−04 | 2.296E−03 | −1.083E−03 |
| H | 1.166E−04 | −4.084E−02 | −3.712E−05 | −4.503E−05 | −8.470E−05 | −3.333E−04 | 1.570E−04 |
| J | 2.939E−04 | 1.260E−02 | 1.531E−06 | 1.841E−06 | 3.700E−06 | 2.120E−05 | −9.355E−06 |
| L | −1.303E−04 | −2.771E−03 | 0.000E+00 | 0.000E+00 | 0.000E+00 | 0.000E+00 | 0.000E+00 |
| M | 2.878E−05 | 4.231E−04 | 0.000E+00 | 0.000E+00 | 0.000E+00 | 0.000E+00 | 0.000E+00 |
| N | −3.679E−06 | −4.263E−05 | 0.000E+00 | 0.000E+00 | 0.000E+00 | 0.000E+00 | 0.000E+00 |
| O | 2.598E−07 | 2.547E−06 | 0.000E+00 | 0.000E+00 | 0.000E+00 | 0.000E+00 | 0.000E+00 |
| P | −7.877E−09 | −6.836E−08 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.808E+01 | 1.083E+01 | 1.119E+01 | 6.587E+01 | −6.790E+01 | −8.853E+01 | 4.638E+01 |
| A | −9.167E−03 | 5.692E−03 | 7.059E−03 | −1.996E−02 | −2.905E−02 | −7.134E−02 | −9.502E−02 |
| B | 3.929E−02 | 1.533E−02 | −4.358E−02 | 2.327E−02 | 5.212E−03 | 1.417E−02 | 6.862E−02 |
| C | −8.301E−02 | −2.724E−01 | 1.402E−01 | −1.440E−01 | −6.352E−02 | 8.845E−02 | −7.722E−02 |
| D | 9.578E−02 | 1.013E+00 | −3.199E−01 | 3.526E−01 | 2.200E−01 | −1.887E−01 | 1.355E−01 |
| E | −6.608E−02 | −2.020E+00 | 5.383E−01 | −4.887E−01 | −3.737E−01 | 2.236E−01 | −1.744E−01 |
| F | 2.792E−02 | 2.556E+00 | −6.565E−01 | 4.239E−01 | 3.886E−01 | −1.869E−01 | 1.422E−01 |
| G | −7.029E−03 | −2.203E+00 | 5.750E−01 | −2.363E−01 | −2.707E−01 | 1.169E−01 | −7.704E−02 |
| H | 9.603E−04 | 1.336E+00 | −3.612E−01 | 8.132E−02 | 1.318E−01 | −5.495E−02 | 2.891E−02 |
| J | −5.428E−05 | −5.771E−01 | 1.624E−01 | −1.372E−02 | −4.563E−02 | 1.916E−02 | −7.681E−03 |
| L | 0.000E+00 | 1.767E−01 | −5.169E−02 | −1.035E−03 | 1.121E−02 | −4.836E−03 | 1.446E−03 |
| M | 0.000E+00 | −3.750E−02 | 1.137E−02 | 1.102E−03 | −1.917E−03 | 8.532E−04 | −1.891E−04 |
| N | 0.000E+00 | 5.241E−03 | −1.641E−03 | −2.513E−04 | 2.173E−04 | −9.928E−05 | 1.636E−05 |
| O | 0.000E+00 | −4.336E−04 | 1.400E−04 | 2.710E−05 | −1.470E−05 | 6.823E−06 | −8.417E−07 |
| P | 0.000E+00 | 1.606E−05 | −5.344E−06 | −1.187E−06 | 4.499E−07 | −2.092E−07 | 1.950E−08 |

| Surface No. | S15 | S16 | S17 | S18 | S19 | S20 |
|---|---|---|---|---|---|---|
| K | 4.175E+00 | 1.784E+00 | −6.822E+00 | −1.542E+01 | 3.249E+01 | −7.159E+00 |
| A | 2.556E−02 | 8.723E−03 | 5.451E−03 | 1.739E−02 | −6.153E−02 | −4.320E−02 |
| B | −4.607E−02 | −2.297E−02 | −1.206E−02 | −1.015E−02 | 1.579E−02 | 1.651E−02 |
| C | 7.010E−02 | 2.407E−02 | 1.884E−03 | 1.487E−03 | −1.903E−03 | −5.241E−03 |
| D | −4.679E−02 | −9.044E−03 | 2.575E−03 | 4.369E−04 | −3.114E−04 | 1.355E−03 |
| E | 4.594E−03 | −2.890E−03 | −2.036E−03 | −2.648E−04 | 2.047E−04 | −2.722E−04 |
| F | 1.251E−02 | 4.357E−03 | 7.450E−04 | 5.536E−05 | −4.790E−05 | 4.093E−05 |
| G | −9.226E−03 | −2.069E−03 | −1.645E−04 | −4.515E−06 | 6.745E−06 | −4.537E−06 |
| H | 3.438E−03 | 5.743E−04 | 2.294E−05 | −3.541E−07 | −6.333E−07 | 3.681E−07 |
| J | −8.118E−04 | −1.045E−04 | −1.909E−06 | 1.346E−07 | 4.106E−08 | −2.170E−08 |
| L | 1.285E−04 | 1.287E−05 | 6.657E−08 | −1.649E−08 | −1.852E−09 | 9.154E−10 |
| M | −1.369E−05 | −1.068E−06 | 3.286E−09 | 1.148E−09 | 5.720E−11 | −2.687E−11 |

TABLE 12-continued

| | | | | | | |
|---|---|---|---|---|---|---|
| N | 9.444E−07 | 5.737E−08 | −4.751E−10 | −4.810E−11 | −1.156E−12 | 5.201E−13 |
| O | −3.821E−08 | −1.803E−09 | 2.064E−11 | 1.134E−12 | 1.377E−14 | −5.962E−15 |
| P | 6.889E−10 | 2.523E−11 | −3.329E−13 | −1.160E−14 | −7.354E−17 | 3.063E−17 |

Figure 13:
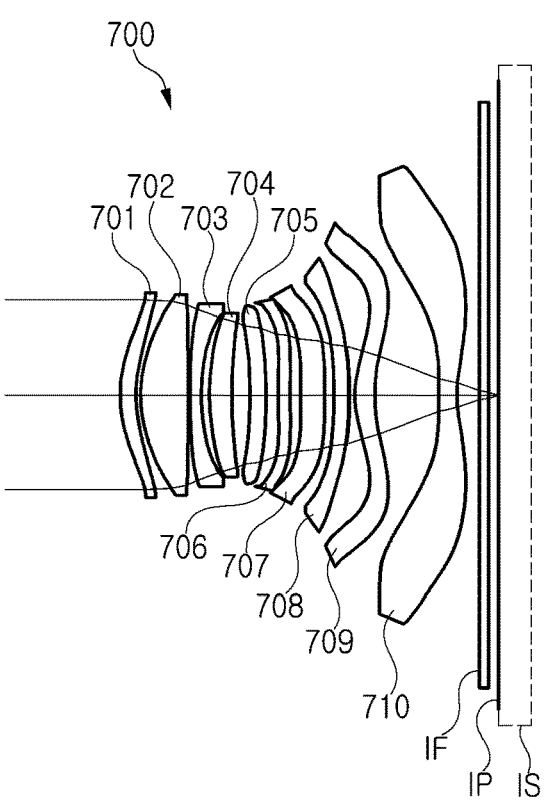
FIG. 13 is a configuration diagram of an imaging lens system according to a seventh embodiment.

An imaging lens system according to a seventh embodiment will be described with reference to FIG. 13.

An imaging lens system 700 includes a first lens 701, a second lens 702, a third lens 703, a fourth lens 704, a fifth lens 705, a sixth lens 706, a seventh lens 707, an eighth lens 708, a ninth lens, and a tenth lens.

The first lens 701 has positive refractive power, and has a convex object-side surface and a concave image-side surface. The second lens 702 has positive refractive power, and has a convex object-side surface and a concave image-side surface. The third lens 703 has negative refractive power, and has a convex object-side surface and a concave image-side surface. The fourth lens 704 has positive refractive power, and has a convex object-side surface and a concave image-side surface. The fifth lens 705 has positive refractive power, and has a concave object-side surface and a convex image-side surface. The sixth lens 706 has negative refractive power, and has a convex object-side surface and a concave image-side surface. In addition, an inflection point is formed on the object-side surface and the image-side surface of the sixth lens 706. The seventh lens 707 has negative refractive power, and has a convex object-side surface and a concave image-side surface. In addition, an inflection point is formed on the object-side surface and the image-side surface of the seventh lens 707. The eighth lens 708 has negative refractive power, and has a concave object-side surface and a convex image-side surface. In addition, an inflection point is formed on the object-side surface and the image-side surface of the eighth lens 708. The ninth lens 709 has positive refractive power, and has a convex object-side surface and a concave image-side surface. In addition, an inflection point is formed on the object-side surface and the image-side surface of the ninth lens 709. The tenth lens 710 has negative refractive power, and has a convex object-side surface and a concave image-side surface. In addition, an inflection point is formed on the object-side surface and the image-side surface of the tenth lens 710.

The imaging lens system 700 may further include a filter IF and an imaging plane IP. The filter IF may be disposed between the tenth lens 710 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 14:
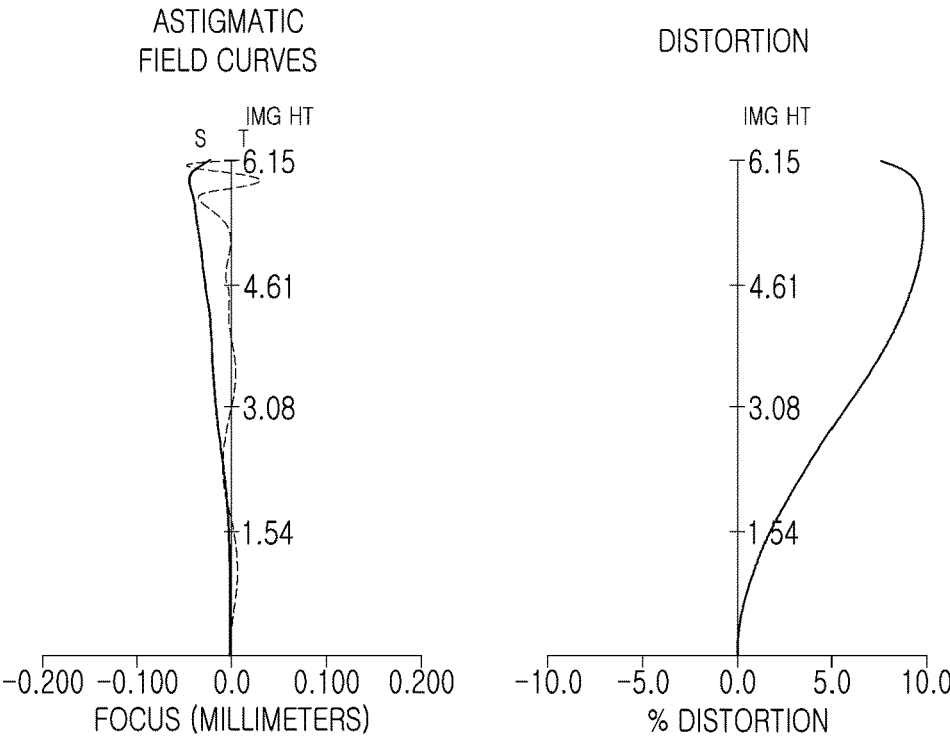
FIG. 14 shows aberration curves of the imaging lens system illustrated in FIG. 13.

Tables 13 and 14 illustrate lens characteristics and aspherical surface values of the imaging lens system according to the present embodiment. FIG. 14 shows aberration curves of the imaging lens system according to the present embodiment.

TABLE 13

| Surface No. | Components | Radius of curvature | Thickness/ distance | Refractive index | Abbe number |
|---|---|---|---|---|---|
| S1 | First lens | 3.1154 | 0.360 | 1.544 | 55.990 |
| S2 | | 3.1537 | 0.113 | | |
| S3 | Second lens | 3.0043 | 1.055 | 1.544 | 55.990 |
| S4 | | 46.5492 | 0.035 | | |
| S5 | Third lens | 14.8696 | 0.261 | 1.639 | 23.490 |
| S6 | | 4.5616 | 0.179 | | |
| S7 | Fourth lens | 5.3635 | 0.500 | 1.544 | 55.990 |
| S8 | | 10.4682 | 0.408 | | |
| S9 | Fifth lens | −11.2542 | 0.356 | 1.671 | 19.240 |
| S10 | | −11.0750 | 0.284 | | |
| S11 | Sixth lens | 28.6870 | 0.255 | 1.671 | 19.240 |
| S12 | | 14.0516 | 0.242 | | |
| S13 | Seventh lens | 58.0636 | 0.537 | 1.544 | 55.990 |
| S14 | | 21.6410 | 0.204 | | |
| S15 | Eighth lens | −7.0780 | 0.336 | 1.615 | 25.900 |
| S16 | | −8.3360 | 0.116 | | |
| S17 | Ninth lens | 2.4345 | 0.456 | 1.544 | 55.990 |
| S18 | | 4.4524 | 1.424 | | |
| S19 | Tenth lens | 35.3681 | 0.407 | 1.535 | 55.740 |
| S20 | | 3.1916 | 0.499 | | |
| S21 | Filter | Infinity | 0.210 | 1.517 | 64.200 |
| S22 | | Infinity | 0.197 | | |
| S23 | Imaging plane | Infinity | 0.002 | | |

TABLE 14

| Surface No. | S1 | S2 | S3 | S4 | S5 | S6 | S7 |
|---|---|---|---|---|---|---|---|
| K | −5.106E+00 | −1.135E+01 | −4.712E+00 | 9.900E+01 | 2.564E+01 | 4.541E+00 | −5.197E+00 |
| A | 9.495E−03 | 7.702E−03 | −3.847E−03 | 3.446E−03 | 4.424E−03 | −5.057E−03 | −2.950E−03 |
| B | −9.918E−04 | −1.313E−02 | 2.798E−03 | −2.096E−02 | −2.531E−02 | −1.723E−02 | 4.661E−03 |
| C | 4.597E−04 | 2.103E−02 | 1.151E−03 | 2.308E−02 | 3.091E−02 | 2.967E−02 | −9.244E−03 |
| D | −3.425E−03 | −3.345E−02 | −2.362E−03 | −1.430E−02 | −2.039E−02 | −3.041E−02 | 9.447E−03 |
| E | 5.468E−03 | 3.987E−02 | 1.833E−03 | 5.549E−03 | 8.469E−03 | 2.042E−02 | −5.082E−03 |
| F | −5.265E−03 | −3.426E−02 | −7.292E−04 | −1.382E−03 | −2.257E−03 | −8.846E−03 | 1.467E−03 |
| G | 3.423E−03 | 2.137E−02 | 1.583E−04 | 2.162E−04 | 3.773E−04 | 2.377E−03 | −1.528E−04 |
| H | −1.552E−03 | −9.696E−03 | −1.801E−05 | −1.955E−05 | −3.639E−05 | −3.594E−04 | −1.963E−05 |
| J | 4.971E−04 | 3.187E−03 | 8.433E−07 | 7.856E−07 | 1.553E−06 | 2.315E−05 | 4.435E−06 |
| L | −1.120E−04 | −7.490E−04 | 0.000E+00 | 0.000E+00 | 0.000E+00 | 0.000E+00 | 0.000E+00 |
| M | 1.738E−05 | 1.225E−04 | 0.000E+00 | 0.000E+00 | 0.000E+00 | 0.000E+00 | 0.000E+00 |
| N | −1.768E−06 | −1.322E−05 | 0.000E+00 | 0.000E+00 | 0.000E+00 | 0.000E+00 | 0.000E+00 |
| O | 1.061E−07 | 8.465E−07 | 0.000E+00 | 0.000E+00 | 0.000E+00 | 0.000E+00 | 0.000E+00 |
| P | −2.847E−09 | −2.433E−08 | 0.000E+00 | 0.000E+00 | 0.000E+00 | 0.000E+00 | 0.000E+00 |

TABLE 14-continued

| Surface No. | S8 | S9 | S10 | S11 | S12 | S13 | S14 |
|---|---|---|---|---|---|---|---|
| K | -2.770E+01 | 1.104E+01 | 1.099E+01 | 4.165E+01 | -6.206E+01 | -4.724E+01 | 5.042E+01 |
| A | 1.409E-04 | 4.631E-03 | 6.871E-03 | -1.872E-02 | -3.683E-02 | -7.805E-02 | -1.065E-01 |
| B | -3.477E-03 | -2.885E-02 | -2.732E-02 | -4.892E-03 | 2.692E-02 | 5.895E-02 | 1.065E-01 |
| C | 5.717E-03 | 6.986E-02 | 7.457E-02 | 1.041E-02 | -3.997E-02 | 2.203E-06 | -1.099E-01 |
| D | -6.655E-03 | -1.046E-01 | -1.596E-01 | -5.562E-02 | 3.125E-02 | -1.250E-01 | 1.095E-01 |
| E | 5.001E-03 | 9.635E-02 | 2.602E-01 | 1.544E-01 | 9.921E-03 | 2.516E-01 | -9.455E-02 |
| F | -2.377E-03 | -4.958E-02 | -3.141E-01 | -2.415E-01 | -5.183E-02 | -2.845E-01 | 6.154E-02 |
| G | 7.286E-04 | 6.408E-03 | 2.774E-01 | 2.401E-01 | 5.988E-02 | 2.121E-01 | -2.893E-02 |
| H | -1.328E-04 | 8.775E-03 | -1.784E-01 | -1.612E-01 | -3.969E-02 | -1.094E-01 | 9.856E-03 |
| J | 1.082E-05 | -6.072E-03 | 8.317E-02 | 7.508E-02 | 1.717E-02 | 3.971E-02 | -2.455E-03 |
| L | 0.000E+00 | 1.599E-03 | -2.774E-02 | -2.437E-02 | -5.014E-03 | -1.011E-02 | 4.460E-04 |
| M | 0.000E+00 | -5.562E-05 | 6.440E-03 | 5.416E-03 | 9.826E-04 | 1.768E-03 | -5.778E-05 |
| N | 0.000E+00 | -7.010E-05 | -9.879E-04 | -7.861E-04 | -1.240E-04 | -2.020E-04 | 5.061E-06 |
| O | 0.000E+00 | 1.615E-05 | 8.992E-05 | 6.719E-05 | 9.118E-06 | 1.359E-05 | -2.682E-07 |
| P | 0.000E+00 | -1.164E-06 | -3.675E-06 | -2.564E-06 | -2.964E-07 | -4.072E-07 | 6.475E-09 |

| Surface No. | S15 | S16 | S17 | S18 | S19 | S20 |
|---|---|---|---|---|---|---|
| K | 4.558E+00 | 1.466E+00 | -6.979E+00 | -1.483E+01 | 2.745E+01 | -7.447E+00 |
| A | 1.173E-02 | 6.906E-03 | 5.898E-03 | 2.773E-02 | -6.511E-02 | -4.526E-02 |
| B | 8.991E-03 | -2.143E-02 | -2.848E-02 | -2.856E-02 | 2.167E-02 | 1.908E-02 |
| C | -1.754E-02 | 3.271E-02 | 2.991E-02 | 1.827E-02 | -5.799E-03 | -6.349E-03 |
| D | 2.847E-02 | -2.455E-02 | -2.046E-02 | -8.958E-03 | 1.117E-03 | 1.578E-03 |
| E | -3.380E-02 | 9.234E-03 | 9.463E-03 | 3.214E-03 | -1.260E-04 | -2.899E-04 |
| F | 2.389E-02 | -1.258E-03 | -3.084E-03 | -8.358E-04 | 3.900E-06 | 3.944E-05 |
| G | -1.057E-02 | -3.621E-04 | 7.273E-04 | 1.581E-04 | 1.045E-06 | -3.993E-06 |
| H | 3.095E-03 | 2.177E-04 | -1.258E-04 | -2.182E-05 | -1.835E-07 | 3.006E-07 |
| J | -6.170E-04 | -5.231E-05 | 1.602E-05 | 2.191E-06 | 1.546E-08 | -1.670E-08 |
| L | 8.434E-05 | 7.525E-06 | -1.484E-06 | -1.583E-07 | -8.083E-10 | 6.727E-10 |
| M | -7.768E-06 | -6.921E-07 | 9.733E-08 | 8.006E-09 | 2.746E-11 | -1.905E-11 |
| N | 4.589E-07 | 4.005E-08 | -4.279E-09 | -2.688E-10 | -5.930E-13 | 3.589E-13 |
| O | -1.557E-08 | -1.334E-09 | 1.129E-10 | 5.378E-12 | 7.428E-15 | -4.029E-15 |
| P | 2.268E-10 | 1.955E-11 | -1.350E-12 | -4.848E-14 | -4.122E-17 | 2.036E-17 |

Figure 15:
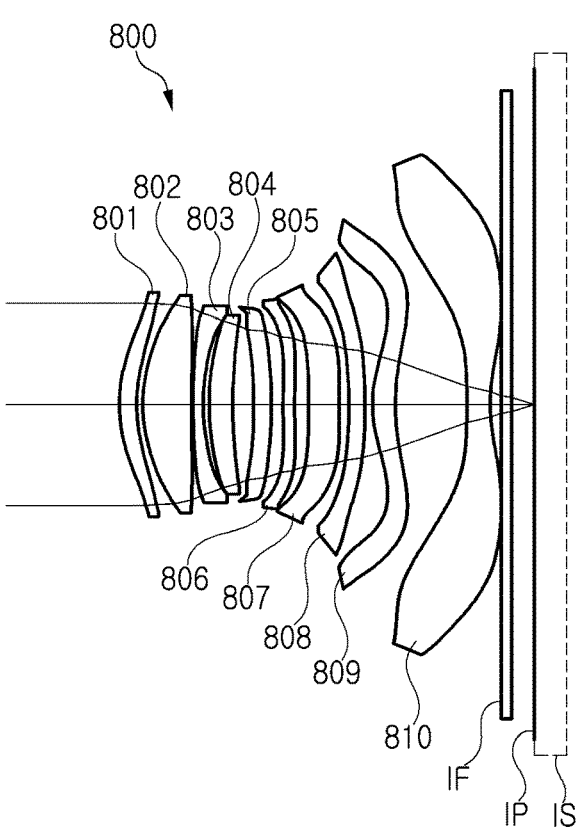
FIG. 15 is a configuration diagram of an imaging lens system according to an eighth embodiment.

An imaging lens system according to an eighth embodiment will be described with reference to FIG. 15.

An imaging lens system 800 includes a first lens 801, a second lens 802, a third lens 803, a fourth lens 804, a fifth lens 805, a sixth lens 806, a seventh lens 807, an eighth lens 808, a ninth lens 809, and a tenth lens 810.

The first lens 801 has positive refractive power, and has a convex object-side surface and a concave image-side surface. The second lens 802 has positive refractive power, and has a convex object-side surface and a concave image-side surface. The third lens 803 has negative refractive power, and has a convex object-side surface and a concave image-side surface. The fourth lens 804 has positive refractive power, and has a convex object-side surface and a concave image-side surface. The fifth lens 805 has positive refractive power, and has a concave object-side surface and a convex image-side surface. The sixth lens 806 has negative refractive power, and has a convex object-side surface and a concave image-side surface. In addition, an inflection point is formed on the object-side surface and the image-side surface of the sixth lens 806. The seventh lens 807 has negative refractive power, and has a convex object-side surface and a concave image-side surface. In addition, an inflection point is formed on the object-side surface and the image-side surface of the seventh lens 807. The eighth lens 808 has negative refractive power, and has a concave object-side surface and a convex image-side surface. In addition, an inflection point is formed on the object-side surface and the image-side surface of the eighth lens 808. The ninth lens 809 has positive refractive power, and has a convex object-side surface and a concave image-side surface. In addition, an inflection point is formed on the object-side surface and the image-side surface of the ninth lens 809. The tenth lens 810 has negative refractive power, and has a convex object-side surface and a concave image-side surface. In addition, an inflection point is formed on the object-side surface and the image-side surface of the tenth lens 810.

The imaging lens system 800 may further include a filter IF and an imaging plane IP. The filter IF may be disposed between the tenth lens 810 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 16:
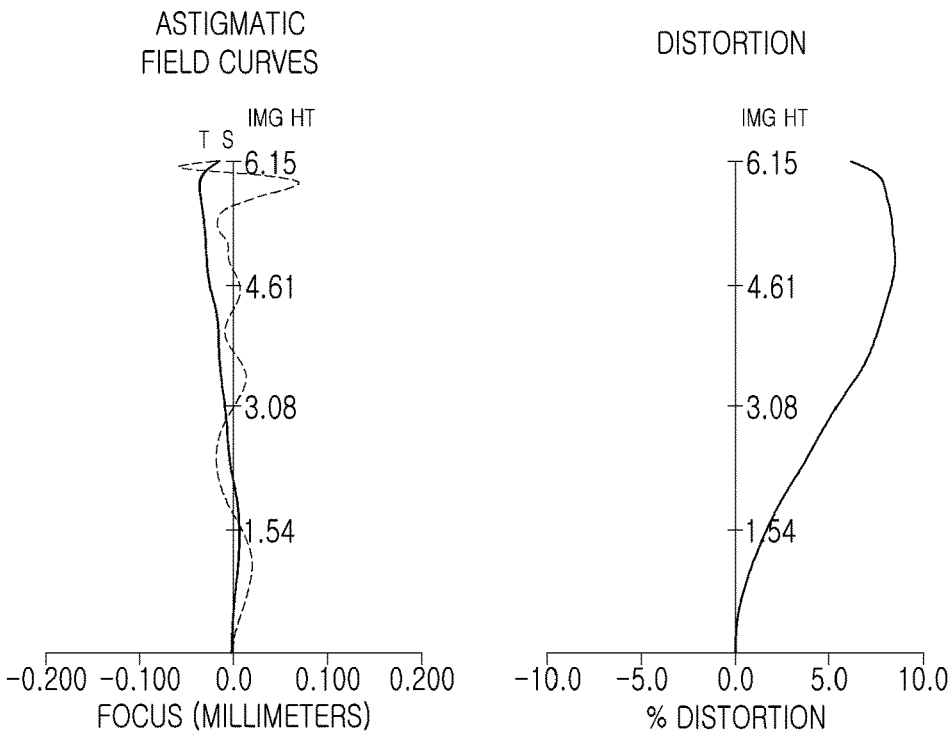
FIG. 16 shows aberration curves of the imaging lens system illustrated in FIG. 15.

Tables 15 and 16 illustrate lens characteristics and aspherical surface values of the imaging lens system according to the present embodiment. FIG. 16 shows aberration curves of the imaging lens system according to the present embodiment.

TABLE 15

| Surface No. | Components | Radius of curvature | Thickness/ distance | Refractive index | Abbe number |
|---|---|---|---|---|---|
| S1 | First lens | 3.1148 | 0.360 | 1.544 | 55.990 |
| S2 | | 3.1437 | 0.122 | | |
| S3 | Second lens | 2.9950 | 0.997 | 1.544 | 55.990 |
| S4 | | 36.9295 | 0.030 | | |
| S5 | Third lens | 13.7168 | 0.210 | 1.639 | 23.490 |
| S6 | | 4.5614 | 0.122 | | |
| S7 | Fourth lens | 5.3759 | 0.485 | 1.544 | 55.990 |
| S8 | | 10.3483 | 0.427 | | |
| S9 | Fifth lens | -11.3064 | 0.356 | 1.671 | 19.240 |
| S10 | | -11.0664 | 0.246 | | |
| S11 | Sixth lens | 29.7738 | 0.239 | 1.671 | 19.240 |
| S12 | | 14.4358 | 0.285 | | |
| S13 | Seventh lens | 46.5173 | 0.631 | 1.544 | 55.990 |
| S14 | | 22.5424 | 0.195 | | |

The first lens 901 has positive refractive power, and has a convex object-side surface and a concave image-side surface. The second lens 902 has positive refractive power, and has a convex object-side surface and a concave image-side surface. The third lens 903 has negative refractive power, and has a convex object-side surface and a concave image-side surface. The fourth lens 904 has positive refractive power, and has a convex object-side surface and a concave image-side surface. The fifth lens 905 has positive refractive power, and has a concave object-side surface and a convex image-side surface. The sixth lens 906 has negative refractive power, and has a concave object-side surface and a concave image-side surface. In addition, an inflection point

TABLE 15-continued

| Surface No. | Components | Radius of curvature | Thickness/ distance | Refractive index | Abbe number |
|---|---|---|---|---|---|
| S15 | Eighth lens | −7.0871 | 0.333 | 1.615 | 25.900 |
| S16 |  | −8.8437 | 0.136 |  |  |
| S17 | Ninth lens | 2.5388 | 0.466 | 1.544 | 55.990 |
| S18 |  | 4.9371 | 1.455 |  |  |
| S19 | Tenth lens | 37.3440 | 0.490 | 1.535 | 55.740 |
| S20 |  | 3.1431 | 0.225 |  |  |
| S21 | Filter | Infinity | 0.210 | 1.517 | 64.200 |
| S22 |  | Infinity | 0.451 |  |  |
| S23 | Imaging plane | Infinity | 0.002 |  |  |

TABLE 16

| Surface No. | S1 | S2 | S3 | S4 | S5 | S6 | S7 |
|---|---|---|---|---|---|---|---|
| K | −5.126E+00 | −1.124E+01 | −4.697E+00 | 9.900E+01 | 2.677E+01 | 4.527E+00 | −5.048E+00 |
| A | 6.789E−03 | 4.209E−03 | −6.185E−03 | −1.413E−03 | 3.548E−03 | −1.353E−03 | 2.239E−04 |
| B | 1.176E−02 | 8.119E−04 | 9.975E−03 | −1.042E−02 | −2.384E−02 | −2.967E−02 | −8.046E−03 |
| C | −3.089E−02 | −4.452E−03 | −8.017E−03 | 1.268E−02 | 3.376E−02 | 5.218E−02 | 1.578E−02 |
| D | 4.685E−02 | −1.028E−03 | 4.385E−03 | −8.858E−03 | −2.775E−02 | −5.575E−02 | −1.876E−02 |
| E | −4.997E−02 | 8.472E−03 | −1.383E−03 | 4.053E−03 | 1.487E−02 | 3.772E−02 | 1.408E−02 |
| F | 3.794E−02 | −1.128E−02 | 2.754E−04 | −1.210E−03 | −5.126E−03 | −1.604E−02 | 6.560E−03 |
| G | −2.085E−02 | 8.830E−03 | −3.716E−05 | 2.242E−04 | 1.087E−03 | 4.172E−03 | 1.905E−03 |
| H | 8.382E−03 | −4.644E−03 | 3.170E−06 | −2.329E−05 | −1.284E−04 | −6.097E−04 | −3.208E−04 |
| J | −2.469E−03 | 1.696E−03 | −1.253E−07 | 1.032E−06 | 6.436E−06 | 3.831E−05 | 2.394E−05 |
| L | 5.271E−04 | −4.316E−04 | 0.000E+00 | 0.000E+00 | 0.000E+00 | 0.000E+00 | 0.000E+00 |
| M | −7.950E−05 | 7.503E−05 | 0.000E+00 | 0.000E+00 | 0.000E+00 | 0.000E+00 | 0.000E+00 |
| N | 8.034E−06 | −8.495E−06 | 0.000E+00 | 0.000E+00 | 0.000E+00 | 0.000E+00 | 0.000E+00 |
| O | −4.881E−07 | 5.642E−07 | 0.000E+00 | 0.000E+00 | 0.000E+00 | 0.000E+00 | 0.000E+00 |
| P | 1.347E−08 | −1.668E−08 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.532E+01 | 1.189E+01 | 1.114E+01 | −1.212E+00 | −6.100E+01 | 5.134E+01 | 3.431E+01 |
| A | −3.748E−04 | 1.032E−02 | 1.074E−02 | −2.574E−02 | −4.538E−02 | −7.463E−02 | −1.003E−01 |
| B | −3.510E−04 | −7.590E−02 | −4.665E−02 | 2.992E−02 | 5.900E−02 | 4.873E−02 | 6.354E−02 |
| C | −2.116E−03 | 2.777E−01 | 1.474E−01 | −5.737E−02 | −9.640E−02 | 2.850E−02 | 6.866E−03 |
| D | 5.111E−03 | −6.945E−01 | −3.456E−01 | 2.299E−02 | 1.120E−01 | −1.625E−01 | −5.177E−02 |
| E | −5.436E−03 | 1.219E+00 | 5.748E−01 | 9.713E−02 | −9.859E−02 | 2.688E−01 | 3.479E−02 |
| F | 3.191E−03 | −1.532E+00 | −6.812E−01 | −2.273E−01 | 6.502E−02 | −2.736E−01 | −2.850E−03 |
| G | −1.026E−03 | 1.398E+00 | 5.826E−01 | 2.630E−01 | −3.038E−02 | 1.920E−01 | −8.902E−03 |
| H | 1.668E−04 | −9.319E−01 | −3.625E−01 | −1.945E−01 | 8.996E−03 | −9.603E−02 | 6.340E−03 |
| J | −1.047E−05 | 4.529E−01 | 1.641E−01 | 9.804E−02 | −1.123E−03 | 3.443E−02 | −2.321E−03 |
| L | 0.000E+00 | −1.585E−01 | −5.340E−02 | −3.415E−02 | −2.574E−04 | −8.764E−03 | 5.370E−04 |
| M | 0.000E+00 | 3.885E−02 | 1.217E−02 | 8.103E−03 | 1.453E−04 | 1.543E−03 | −8.162E−05 |
| N | 0.000E+00 | −6.324E−03 | −1.840E−03 | −1.251E−03 | −2.898E−05 | −1.781E−04 | 7.947E−06 |
| O | 0.000E+00 | 6.136E−04 | 1.659E−04 | 1.134E−04 | 2.855E−06 | 1.212E−05 | −4.513E−07 |
| P | 0.000E+00 | −2.683E−05 | −6.739E−06 | −4.574E−06 | −1.152E−07 | −3.674E−07 | 1.139E−08 |

| Surface No. | S15 | S16 | S17 | S18 | S19 | S20 |
|---|---|---|---|---|---|---|
| K | 4.534E+00 | 1.506E−01 | −7.052E+00 | −1.616E+01 | −1.742E+01 | −8.485E+00 |
| A | 7.662E−03 | 1.319E−03 | −8.699E−04 | 2.312E−02 | −5.392E−02 | −3.011E−02 |
| B | −2.139E−02 | −1.924E−02 | 1.707E−02 | −2.483E−02 | 1.132E−02 | 9.809E−03 |
| C | 1.019E−01 | 5.854E−02 | 1.962E−02 | 1.639E−02 | −1.887E−04 | −3.141E−03 |
| D | −1.486E−01 | −7.086E−02 | −1.500E−02 | −8.377E−03 | −8.710E−04 | 9.533E−04 |
| E | 1.125E−01 | 4.782E−02 | 7.615E−03 | 3.105E−03 | 3.409E−04 | −2.317E−04 |
| F | −5.273E−02 | −2.067E−02 | −2.685E−03 | −8.290E−04 | −7.081E−05 | 4.057E−05 |
| G | 1.643E−02 | 6.105E−03 | 6.770E−04 | 1.605E−04 | 9.415E−06 | −4.990E−06 |
| H | −3.509E−03 | −1.272E−03 | −1.241E−04 | −2.265E−05 | −8.527E−07 | 4.321E−07 |
| J | 5.147E−04 | 1.893E−04 | 1.658E−05 | 2.323E−06 | 5.391E−08 | −2.641E−08 |
| L | −5.078E−05 | −2.004E−05 | −1.600E−06 | −1.708E−07 | −2.387E−09 | 1.132E−09 |
| M | 3.184E−06 | 1.476E−06 | 1.085E−07 | 8.751E−09 | 7.268E−11 | −3.329E−11 |
| N | −1.112E−07 | −7.203E−08 | −4.900E−09 | −2.963E−10 | −1.453E−12 | 6.394E−13 |
| O | 1.403E−09 | 2.094E−09 | 1.323E−10 | 5.949E−12 | 1.718E−14 | −7.225E−15 |
| P | 1.238E−11 | −2.747E−11 | −1.612E−12 | −5.356E−14 | −9.120E−17 | 3.643E−17 |

60

Figure 17:
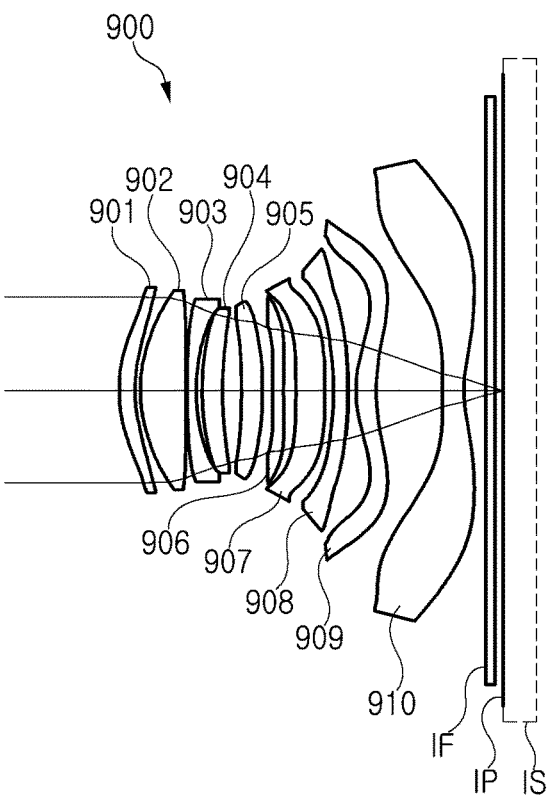
FIG. 17 is a configuration diagram of an imaging lens system according to a ninth embodiment.

An imaging lens system according to a ninth embodiment will be described with reference to FIG. 17.

An imaging lens system 900 includes a first lens 901, a second lens 902, a third lens 903, a fourth lens 904, a fifth lens 905, a sixth lens 906, a seventh lens 907, an eighth lens 908, a ninth lens, and a tenth lens 910.

is formed on the object-side surface and the image-side surface of the sixth lens 906. The seventh lens 907 has negative refractive power, and has a convex object-side surface and a concave image-side surface. In addition, an inflection point is formed on the object-side surface and the image-side surface of the seventh lens 907. The eighth lens

908 has negative refractive power, and has a concave object-side surface and a convex image-side surface. In addition, an inflection point is formed on the object-side surface and the image-side surface of the eighth lens 908. The ninth lens 909 has positive refractive power, and has a convex object-side surface and a concave image-side surface. In addition, an inflection point is formed on the object-side surface and the image-side surface of the ninth lens 909. The tenth lens 910 has negative refractive power, and has a convex object-side surface and a concave image-side surface. In addition, an inflection point is formed on the object-side surface and the image-side surface of the tenth lens 910.

The imaging lens system 900 may further include a filter IF and an imaging plane IP. The filter IF may be disposed between the tenth lens 910 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 18:
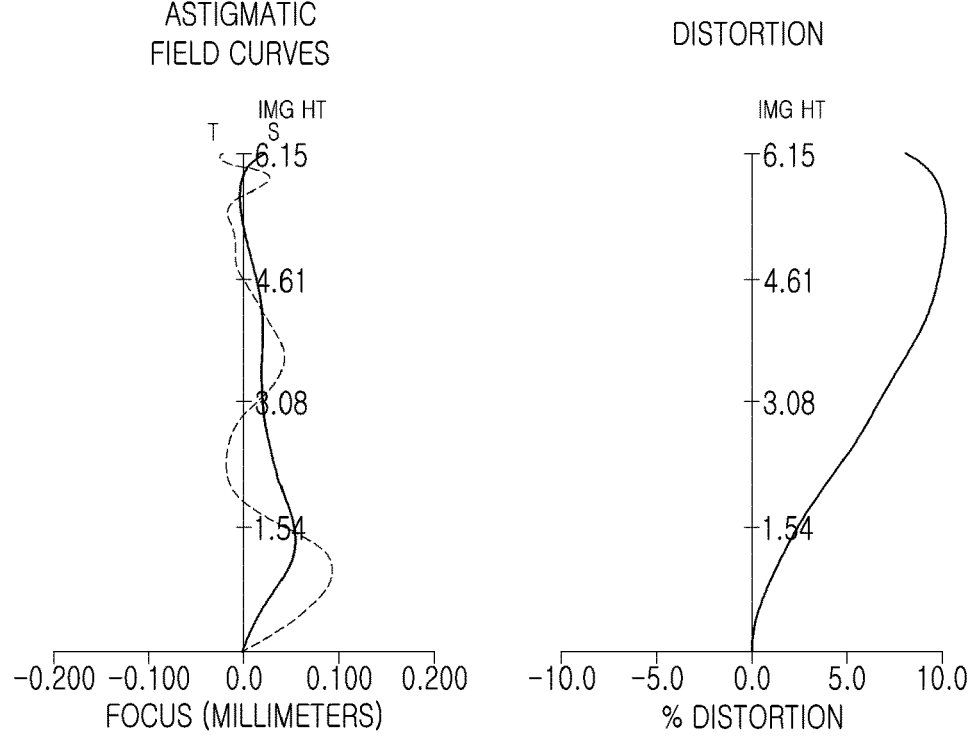
FIG. 18 shows aberration curves of the imaging lens system illustrated in FIG. 17.

Tables 17 and 18 illustrate lens characteristics and aspherical surface values of the imaging lens system according to the present embodiment. FIG. 18 shows aberration curves of the imaging lens system according to the present embodiment.

TABLE 17

| Surface No. | Components | Radius of curvature | Thickness/ distance | Refractive index | Abbe number |
|---|---|---|---|---|---|
| S1 | First lens | 3.1137 | 0.361 | 1.544 | 55.990 |
| S2 | | 3.1569 | 0.116 | | |
| S3 | Second lens | 3.0061 | 1.000 | 1.544 | 55.990 |
| S4 | | 56.2563 | 0.032 | | |
| S5 | Third lens | 15.6088 | 0.211 | 1.639 | 23.490 |
| S6 | | 4.5376 | 0.121 | | |
| S7 | Fourth lens | 5.3718 | 0.460 | 1.544 | 55.990 |
| S8 | | 8.6270 | 0.418 | | |
| S9 | Fifth lens | −15.2332 | 0.466 | 1.671 | 19.240 |
| S10 | | −8.0801 | 0.241 | | |
| S11 | Sixth lens | −130.9933 | 0.232 | 1.671 | 19.240 |
| S12 | | 14.4350 | 0.273 | | |
| S13 | Seventh lens | 39.4493 | 0.642 | 1.544 | 55.990 |
| S14 | | 25.5065 | 0.198 | | |
| S15 | Eighth lens | −6.7687 | 0.321 | 1.615 | 25.900 |
| S16 | | −9.0050 | 0.157 | | |
| S17 | Ninth lens | 2.4911 | 0.459 | 1.544 | 55.990 |
| S18 | | 4.7087 | 1.472 | | |
| S19 | Tenth lens | 32.4588 | 0.485 | 1.535 | 55.740 |
| S20 | | 3.4432 | 0.480 | | |
| S21 | Filter | Infinity | 0.210 | 1.517 | 64.200 |
| S22 | | Infinity | 0.178 | | |
| S23 | Imaging plane | Infinity | 0.002 | | |

TABLE 18

| Surface No. | S1 | S2 | S3 | S4 | S5 | S6 | S7 |
|---|---|---|---|---|---|---|---|
| K | −5.106E+00 | −1.129E+01 | −4.707E+00 | 9.900E+01 | 2.588E+01 | 4.545E+00 | −5.167E+00 |
| A | 2.909E−03 | 5.708E−03 | −6.011E−03 | −3.090E−03 | 2.146E−03 | −4.336E−03 | −3.016E−05 |
| B | 3.379E−02 | −1.058E−02 | 9.428E−03 | −3.301E−03 | −1.448E−02 | −7.885E−03 | −1.764E−03 |
| C | −9.373E−02 | 3.491E−02 | −7.135E−03 | 8.686E−04 | 1.339E−02 | −9.044E−05 | −5.976E−03 |
| D | 1.570E−01 | −7.881E−02 | 3.689E−03 | 1.689E−03 | −6.074E−03 | 9.280E−03 | 1.450E−02 |
| E | −1.778E−01 | 1.064E−01 | −1.059E−03 | −1.575E−03 | 1.666E−03 | −9.361E−03 | −1.384E−02 |
| F | 1.405E−01 | −9.489E−02 | 1.757E−04 | 6.412E−04 | −2.689E−04 | 4.584E−03 | 7.240E−03 |
| G | −7.926E−02 | 5.897E−02 | −1.685E−05 | −1.436E−04 | 1.929E−05 | −1.217E−03 | −2.109E−03 |
| H | 3.233E−02 | −2.616E−02 | 7.208E−07 | 1.721E−05 | 8.455E−07 | 1.644E−04 | 3.163E−04 |
| J | −9.557E−03 | 8.344E−03 | 3.481E−09 | −8.639E−07 | −1.893E−07 | −8.729E−06 | −1.864E−05 |
| L | 2.028E−03 | −1.898E−03 | 0.000E+00 | 0.000E+00 | 0.000E+00 | 0.000E+00 | 0.000E+00 |
| M | −3.013E−04 | 3.003E−04 | 0.000E+00 | 0.000E+00 | 0.000E+00 | 0.000E+00 | 0.000E+00 |
| N | 2.975E−05 | −3.141E−05 | 0.000E+00 | 0.000E+00 | 0.000E+00 | 0.000E+00 | 0.000E+00 |
| O | −1.754E−06 | 1.950E−06 | 0.000E+00 | 0.000E+00 | 0.000E+00 | 0.000E+00 | 0.000E+00 |
| P | 4.675E−08 | −5.445E−08 | 0.000E+00 | 0.000E+00 | 0.000E+00 | 0.000E+00 | 0.000E+00 |

| Surface No. | S8 | S9 | S10 | S11 | S12 | S13 | S14 |
|---|---|---|---|---|---|---|---|
| K | −2.371E+01 | 1.542E+01 | 9.646E+00 | 9.900E+01 | −4.711E+01 | 9.900E+01 | 2.140E+01 |
| A | −4.038E−03 | 1.606E−02 | 2.420E−03 | −3.874E−02 | −4.896E−02 | −8.621E−02 | −1.044E−01 |
| B | 1.478E−02 | −1.298E−01 | 1.770E−02 | 1.117E−01 | 7.646E−02 | 1.049E−01 | 8.122E−02 |
| C | −3.208E−02 | 5.005E−01 | −1.044E−01 | −3.142E−01 | −1.110E−01 | −1.064E−01 | −2.881E−02 |
| D | 3.952E−02 | −1.266E+00 | 2.776E−01 | 5.465E−01 | 6.966E−02 | 5.014E−02 | −1.041E−02 |
| E | −2.940E−02 | 2.210E+00 | −4.631E−01 | −6.688E−01 | 2.633E−02 | 2.968E−02 | 4.080E−03 |
| F | 1.345E−02 | −2.751E+00 | 5.254E−01 | 6.038E−01 | −9.408E−02 | −7.693E−02 | 1.261E−02 |
| G | −3.656E−03 | 2.491E+00 | −4.196E−01 | −4.093E−01 | 9.428E−02 | 7.309E−02 | −1.435E−02 |
| H | 5.347E−04 | −1.655E+00 | 2.397E−01 | 2.088E−01 | −5.695E−02 | −4.323E−02 | 7.701E−03 |
| J | −3.195E−05 | 8.050E−01 | −9.817E−02 | −7.940E−02 | 2.321E−02 | 1.733E−02 | −2.563E−03 |
| L | 0.000E+00 | −2.831E−01 | 2.855E−02 | 2.212E−02 | −6.550E−03 | −4.779E−03 | 5.677E−04 |
| M | 0.000E+00 | 6.998E−02 | −5.744E−03 | −4.372E−03 | 1.264E−03 | 8.934E−04 | −8.437E−05 |
| N | 0.000E+00 | −1.152E−02 | 7.581E−04 | 5.801E−04 | −1.593E−04 | −1.080E−04 | 8.123E−06 |
| O | 0.000E+00 | 1.132E−03 | −5.888E−05 | −4.632E−05 | 1.182E−05 | 7.613E−06 | −4.590E−07 |
| P | 0.000E+00 | −5.020E−05 | 2.032E−06 | 1.683E−06 | −3.908E−07 | −2.373E−07 | 1.157E−08 |

| Surface No. | S15 | S16 | S17 | S18 | S19 | S20 |
|---|---|---|---|---|---|---|
| K | 4.698E+00 | −5.655E−01 | −7.042E+00 | −1.690E+01 | −5.408E+01 | −7.533E+00 |
| A | 1.328E−03 | 4.980E−03 | 2.091E−03 | 1.985E−02 | −4.961E−02 | −2.667E−02 |
| B | 5.427E−03 | −2.069E−02 | −2.213E−02 | −2.103E−02 | 1.049E−02 | 7.593E−03 |
| C | 4.245E−02 | 5.092E−02 | 2.573E−02 | 1.417E−02 | −1.412E−03 | −1.973E−03 |
| D | −7.306E−02 | −5.732E−02 | −1.966E−02 | −7.698E−03 | −1.073E−04 | 4.433E−04 |
| E | 5.219E−02 | 3.673E−02 | 1.000E−02 | 3.037E−03 | 1.281E−04 | −8.209E−05 |
| F | −2.032E−02 | −1.516E−02 | −3.542E−03 | −8.550E−04 | −3.531E−05 | 1.192E−05 |
| G | 4.237E−03 | 4.286E−03 | 8.971E−04 | 1.730E−04 | 5.529E−06 | −1.308E−06 |
| H | −2.211E−04 | −8.553E−04 | −1.649E−04 | −2.532E−05 | −5.624E−07 | 1.057E−07 |

TABLE 18-continued

| | | | | | | |
|---|---|---|---|---|---|---|
| J | −1.245E−04 | 1.219E−04 | 2.203E−05 | 2.679E−06 | 3.893E−08 | −6.185E−09 |
| L | 3.831E−05 | −1.236E−05 | −2.116E−06 | −2.027E−07 | −1.858E−09 | 2.577E−10 |
| M | −5.511E−06 | 8.728E−07 | 1.422E−07 | 1.067E−08 | 6.032E−11 | −7.426E−12 |
| N | 4.539E−07 | −4.084E−08 | −6.346E−09 | −3.710E−10 | −1.276E−12 | 1.405E−13 |
| O | −2.059E−08 | 1.140E−09 | 1.687E−10 | 7.644E−12 | 1.587E−14 | −1.568E−15 |
| P | 4.007E−10 | −1.439E−11 | −2.019E−12 | −7.061E−14 | −8.813E−17 | 7.819E−18 |

Figure 19:
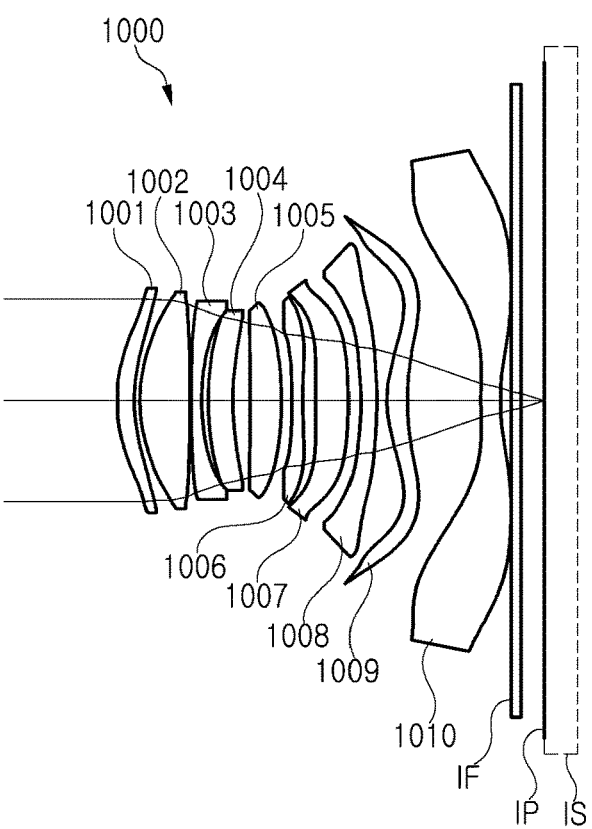
FIG. 19 is a configuration diagram of an imaging lens system according to a tenth embodiment.

An imaging lens system according to a tenth embodiment will be described with reference to FIG. 19.

An imaging lens system 1010 includes a first lens 1001, a second lens 1002, a third lens 1003, a fourth lens 1004, a fifth lens 1005, a sixth lens 1006, a seventh lens 1007, an eighth lens 1008, a ninth lens, and a tenth lens.

The first lens 1001 has positive refractive power, and has a convex object-side surface and a concave image-side surface. The second lens 1002 has positive refractive power, and has a convex object-side surface and a convex image-side surface. The third lens 1003 has negative refractive power, and has a convex object-side surface and a concave image-side surface. The fourth lens 1004 has positive refractive power, and has a convex object-side surface and a concave image-side surface. The fifth lens 1005 has positive refractive power, and has a convex object-side surface and a convex image-side surface. The sixth lens 1006 has negative refractive power, and has a concave object-side surface and a concave image-side surface. In addition, an inflection point is formed on the object-side surface and the image-side surface of the sixth lens 1006. The seventh lens 1007 has positive refractive power, and has a convex object-side surface and a concave image-side surface. In addition, an inflection point is formed on the object-side surface and the image-side surface of the seventh lens 1007. The eighth lens 1008 has negative refractive power, and has a concave object-side surface and a convex image-side surface. In addition, an inflection point is formed on the object-side surface and the image-side surface of the eighth lens 1008. The ninth lens 1009 has positive refractive power, and has a convex object-side surface and a concave image-side surface. In addition, an inflection point is formed on the object-side surface and the image-side surface of the ninth lens 1009. The tenth lens 1010 has negative refractive power, and has a convex object-side surface and a concave image-side surface. In addition, an inflection point is formed on the object-side surface and the image-side surface of the tenth lens 1010.

The imaging lens system 1000 may further include a filter IF and an imaging plane IP. The filter IF may be disposed between the tenth lens 1010 and the imaging plane IP. The filter IF may be omitted if necessary. The imaging plane IP may be formed on one surface of an image sensor IS or inside the image sensor IS of the camera module. However, a position of the imaging plane IP is not limited to one surface or the inside of the image sensor IS.

Figure 20:
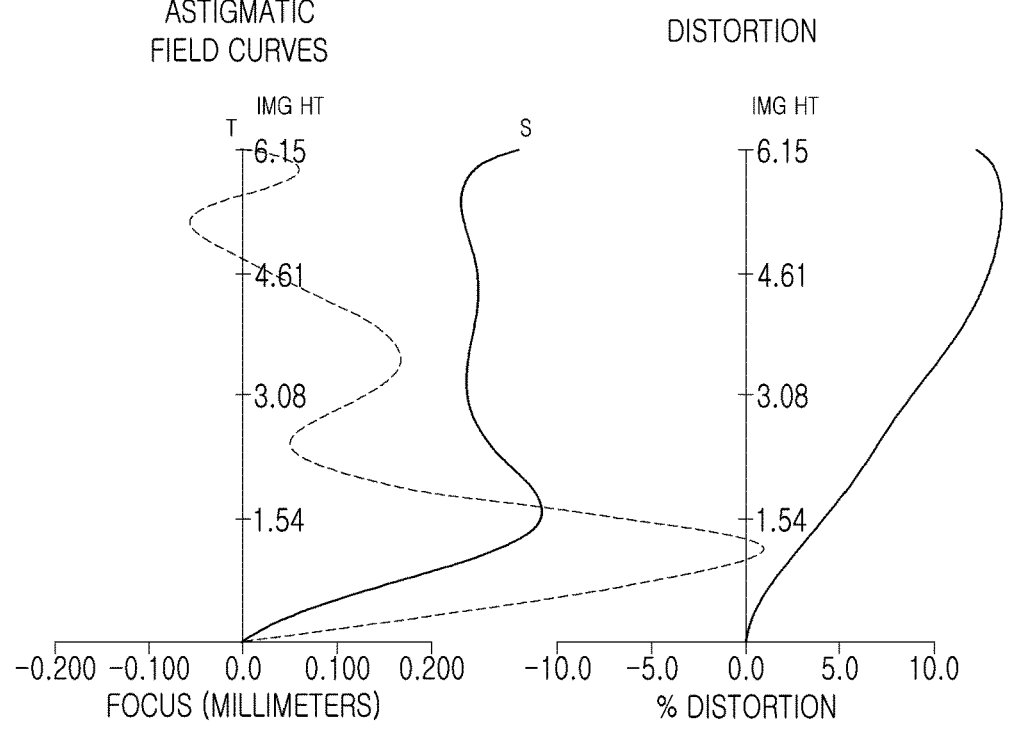
FIG. 20 shows aberration curve of the imaging lens system illustrated in FIG. 19.

Tables 19 and 20 illustrate lens characteristics and aspherical surface values of the imaging lens system according to the present embodiment. FIG. 20 shows aberration curves of the imaging lens system according to the present embodiment.

TABLE 19

| Surface No. | Components | Radius of curvature | Thickness/ distance | Refractive index | Abbe number |
|---|---|---|---|---|---|
| S1 | First lens | 3.1118 | 0.360 | 1.544 | 55.990 |
| S2 | | 3.2298 | 0.107 | | |
| S3 | Second lens | 3.0699 | 1.021 | 1.544 | 55.990 |
| S4 | | −381.6564 | 0.030 | | |
| S5 | Third lens | 22.7208 | 0.210 | 1.639 | 23.490 |
| S6 | | 4.5126 | 0.134 | | |
| S7 | Fourth lens | 5.3495 | 0.505 | 1.544 | 55.990 |
| S8 | | 5.4562 | 0.354 | | |
| S9 | Fifth lens | 183.6725 | 0.641 | 1.671 | 19.240 |
| S10 | | −6.9519 | 0.207 | | |
| S11 | Sixth lens | −29.4030 | 0.237 | 1.671 | 19.240 |
| S12 | | 11.4185 | 0.266 | | |
| S13 | Seventh lens | 23.3894 | 0.638 | 1.544 | 55.990 |
| S14 | | 31.7992 | 0.264 | | |
| S15 | Eighth lens | −6.5702 | 0.325 | 1.615 | 25.900 |
| S16 | | −10.2531 | 0.205 | | |
| S17 | Ninth lens | 2.4557 | 0.421 | 1.544 | 55.990 |
| S18 | | 4.7115 | 1.504 | | |
| S19 | Tenth lens | 35.1516 | 0.400 | 1.535 | 55.740 |
| S20 | | 4.3537 | 0.213 | | |
| S21 | Filter | Infinity | 0.210 | 1.517 | 64.200 |
| S22 | | Infinity | 0.465 | | |
| S23 | Imaging plane | Infinity | 0.002 | | |

TABLE 20

| Surface No. | S1 | S2 | S3 | S4 | S5 | S6 | S7 |
|---|---|---|---|---|---|---|---|
| K | −5.098E+00 | −1.128E+01 | −4.777E+00 | 9.900E+01 | 1.817E+01 | 4.562E+00 | −5.653E+00 |
| A | −1.318E−02 | 1.815E−02 | −3.091E−03 | −3.939E−03 | 5.816E−03 | −1.943E−02 | 8.335E−03 |
| B | 1.209E−01 | −7.059E−02 | −1.512E−03 | −1.095E−03 | −1.794E−02 | 5.538E−02 | −5.317E−02 |
| C | −3.428E−01 | 1.840E−01 | 8.632E−03 | −4.951E−03 | 1.043E−02 | −1.122E−01 | 1.153E−01 |
| D | 5.964E−01 | −3.126E−01 | −8.762E−03 | 9.093E−03 | −2.716E−04 | 1.228E−01 | −1.357E−01 |
| E | −6.909E−01 | 3.540E−01 | 4.896E−03 | −6.284E−03 | −1.828E−03 | −8.128E−02 | 9.521E−02 |
| F | 5.549E−01 | −2.774E−01 | −1.589E−03 | 2.302E−03 | 7.495E−04 | 3.368E−02 | −4.081E−02 |
| G | −3.170E−01 | 1.543E−01 | 2.989E−04 | −4.773E−04 | −1.222E−04 | −8.536E−03 | 1.054E−02 |
| H | 1.305E−01 | −6.181E−02 | −3.050E−05 | 5.319E−05 | 6.931E−06 | 1.209E−03 | −1.513E−03 |
| J | −3.882E−02 | 1.788E−02 | 1.312E−06 | −2.486E−06 | 7.613E−08 | −7.332E−05 | 9.321E−05 |
| L | 8.265E−03 | −3.702E−03 | 0.000E+00 | 0.000E+00 | 0.000E+00 | 0.000E+00 | 0.000E+00 |
| M | −1.227E−03 | 5.356E−04 | 0.000E+00 | 0.000E+00 | 0.000E+00 | 0.000E+00 | 0.000E+00 |
| N | 1.207E−04 | −5.145E−05 | 0.000E+00 | 0.000E+00 | 0.000E+00 | 0.000E+00 | 0.000E+00 |
| O | −7.070E−06 | 2.951E−06 | 0.000E+00 | 0.000E+00 | 0.000E+00 | 0.000E+00 | 0.000E+00 |
| P | 1.865E−07 | −7.651E−08 | 0.000E+00 | 0.000E+00 | 0.000E+00 | 0.000E+00 | 0.000E+00 |

TABLE 20-continued

| Surface No. | S8 | S9 | S10 | S11 | S12 | S13 | S14 |
|---|---|---|---|---|---|---|---|
| K | −2.091E+01 | −9.900E+01 | 9.000E+00 | 9.883E+01 | −2.161E+01 | 8.281E+01 | −6.195E+01 |
| A | −2.217E−02 | 2.329E−02 | −9.750E−03 | −6.923E−02 | −4.565E−02 | −1.142E−01 | −1.053E−01 |
| B | 7.944E−02 | −1.818E−01 | 1.381E−01 | 3.136E−01 | 9.692E−02 | 2.208E−01 | 8.991E−02 |
| C | −1.434E−01 | 6.613E−01 | −5.832E−01 | −9.313E−01 | −1.889E−01 | −3.824E−01 | −4.052E−02 |
| D | 1.555E−01 | −1.532E+00 | 1.388E+00 | 1.645E+00 | 1.966E−01 | 4.885E−01 | −1.204E−02 |
| E | −1.057E−01 | 2.385E+00 | −2.145E+00 | −1.935E+00 | −1.038E−01 | −4.630E−01 | 2.421E−02 |
| F | 4.529E−02 | −2.586E+00 | 2.280E+00 | 1.594E+00 | 5.141E−03 | 3.243E−01 | −1.315E−02 |
| G | −1.182E−02 | 1.998E+00 | −1.717E+00 | −9.372E−01 | 3.380E−02 | −1.654E−01 | 3.803E−03 |
| H | 1.706E−03 | −1.113E+00 | 9.288E−01 | 3.931E−01 | −2.746E−02 | 6.045E−02 | −6.058E−04 |
| J | −1.039E−04 | 4.483E−01 | −3.618E−01 | −1.151E−01 | 1.214E−02 | −1.549E−02 | 3.257E−05 |
| L | 0.000E+00 | −1.290E−01 | 1.005E−01 | 2.231E−02 | −3.486E−03 | 2.683E−03 | 7.949E−06 |
| M | 0.000E+00 | 2.584E−02 | −1.939E−02 | −2.498E−03 | 6.670E−04 | −2.934E−04 | −2.359E−06 |
| N | 0.000E+00 | −3.409E−03 | 2.468E−03 | 8.382E−05 | −8.235E−05 | 1.717E−05 | 3.260E−07 |
| O | 0.000E+00 | 2.654E−04 | −1.862E−04 | 1.233E−05 | 5.943E−06 | −2.509E−07 | −2.527E−08 |
| P | 0.000E+00 | −9.177E−06 | 6.294E−06 | −1.102E−06 | −1.904E−07 | −1.476E−08 | 8.568E−10 |

| Surface No. | S15 | S16 | S17 | S18 | S19 | S20 |
|---|---|---|---|---|---|---|
| K | 4.647E+00 | −3.127E+00 | −6.807E+00 | −1.967E+01 | 5.727E+00 | −6.311E+00 |
| A | −1.995E−03 | 1.634E−02 | 1.311E−02 | 1.931E−02 | −4.254E−02 | −1.789E−02 |
| B | 1.577E−02 | −5.391E−02 | −4.306E−02 | −2.969E−02 | 7.074E−03 | 2.589E−03 |
| C | 7.058E−03 | 9.669E−02 | 4.409E−02 | 2.440E−02 | −1.240E−03 | −2.118E−04 |
| D | −1.199E−02 | −9.424E−02 | −2.760E−02 | −1.321E−02 | 3.028E−04 | −1.693E−05 |
| E | −8.724E−03 | 5.594E−02 | 1.131E−02 | 4.687E−03 | −5.083E−05 | 1.086E−05 |
| F | 1.868E−02 | −2.193E−02 | −3.226E−03 | −1.130E−03 | 3.839E−06 | −2.174E−06 |
| G | −1.273E−02 | 5.950E−03 | 6.686E−04 | 1.911E−04 | 1.273E−07 | 2.574E−07 |
| H | 4.938E−03 | −1.144E−03 | −1.035E−04 | −2.310E−05 | −5.661E−08 | −2.003E−08 |
| J | −1.234E−03 | 1.573E−04 | 1.208E−05 | 2.016E−06 | 5.890E−09 | 1.062E−09 |
| L | 2.063E−04 | −1.536E−05 | −1.054E−06 | −1.268E−07 | −3.461E−10 | −3.862E−11 |
| M | −2.303E−05 | 1.043E−06 | 6.663E−08 | 5.644E−09 | 1.277E−11 | 9.458E−13 |
| N | 1.651E−06 | −4.677E−08 | −2.874E−09 | −1.699E−10 | −2.943E−13 | −1.487E−14 |
| O | −6.890E−08 | 1.247E−09 | 7.528E−11 | 3.127E−12 | 3.894E−15 | 1.350E−16 |
| P | 1.273E−09 | −1.498E−11 | −8.984E−13 | −2.666E−14 | −2.267E−17 | −5.349E−19 |

Tables 21 to 24 illustrate lens characteristics and aspherical surface values of the imaging lens systems according to the first to tenth embodiments.

TABLE 21

| Reference | First embodiment | Second embodiment | Third embodiment | Fourth embodiment | Fifth embodiment |
|---|---|---|---|---|---|
| f1 | 81.056 | 80.799 | 81.254 | 82.040 | 82.174 |
| f2 | 5.899 | 5.910 | 5.919 | 5.920 | 5.917 |
| f3 | −10.107 | −10.139 | −10.180 | −10.200 | −10.188 |
| f4 | 18.967 | 19.011 | 19.058 | 19.084 | 19.078 |
| f5 | −1415.369 | −2118.571 | −1445.282 | −8518.731 | 5115.515 |
| f6 | −48.761 | −47.529 | −46.609 | −45.987 | −44.894 |
| f7 | −49.134 | −52.073 | −54.377 | −52.663 | −53.809 |
| f8 | −103.814 | −97.762 | −97.608 | −101.802 | −100.374 |
| f9 | 8.300 | 8.574 | 8.794 | 8.954 | 8.947 |
| f10 | −6.794 | −6.695 | −6.605 | −6.595 | −6.568 |
| TTL | 8.671 | 8.218 | 8.283 | 8.318 | 8.314 |
| BFL | 1.460 | 0.937 | 0.950 | 0.968 | 0.949 |
| f | 6.550 | 6.650 | 6.836 | 6.819 | 6.801 |
| f number | 1.510 | 1.540 | 1.570 | 1.591 | 1.588 |
| ImgHT | 6.000 | 6.000 | 6.000 | 6.000 | 6.000 |
| FOV | 78.100 | 78.000 | 80.800 | 77.600 | 77.640 |
| SWA11 | 20.540 | 20.560 | 20.580 | 20.570 | 20.570 |
| SWA121 | 32.860 | 32.880 | 32.880 | 32.860 | 32.840 |

TABLE 22

| Reference | Sixth embodiment | Seventh embodiment | Eighth embodiment | Ninth embodiment | Tenth embodiment |
|---|---|---|---|---|---|
| f1 | 88.818 | 109.404 | 115.566 | 106.058 | 75.454 |
| f2 | 5.915 | 5.854 | 5.930 | 5.799 | 5.603 |
| f3 | −10.330 | −10.398 | −10.788 | −10.084 | −8.850 |
| f4 | 19.354 | 19.543 | 19.883 | 24.928 | 188.438 |
| f5 | 681.116 | 576.716 | 487.225 | 25.000 | 10.000 |
| f6 | −41.507 | −41.352 | −42.041 | −19.373 | −12.233 |

TABLE 22-continued

| Reference | Sixth embodiment | Seventh embodiment | Eighth embodiment | Ninth embodiment | Tenth embodiment |
|---|---|---|---|---|---|
| f7 | −57.336 | −63.747 | −81.151 | −134.844 | 158.340 |
| f8 | −111.926 | −84.888 | −62.521 | −46.877 | −30.777 |
| f9 | 9.250 | 9.145 | 8.991 | 9.062 | 8.847 |
| f10 | −6.754 | −6.588 | −6.449 | −7.244 | −9.333 |
| TTL | 8.344 | 8.433 | 8.473 | 8.535 | 8.720 |
| BFL | 0.914 | 0.908 | 0.888 | 0.870 | 0.890 |
| f | 6.819 | 6.850 | 6.831 | 6.800 | 6.800 |
| f number | 1.582 | 1.586 | 1.619 | 1.611 | 1.609 |
| ImgHT | 6.000 | 6.000 | 6.000 | 6.000 | 6.000 |
| FOV | 77.080 | 76.820 | 77.780 | 80.800 | 75.360 |
| SWA11 | 20.920 | 21.050 | 20.950 | 21.010 | 21.080 |
| SWA121 | 32.990 | 33.190 | 33.020 | 32.760 | 32.270 |

TABLE 23

| Conditional Expression | First embodiment | Second embodiment | Third embodiment | Fourth embodiment | Fifth embodiment |
|---|---|---|---|---|---|
| f1/f | 12.375 | 12.150 | 11.887 | 12.031 | 12.083 |
| f2/f | 0.901 | 0.889 | 0.866 | 0.868 | 0.870 |
| f3/f | −1.543 | −1.525 | −1.489 | −1.496 | −1.498 |
| f4/f | 2.896 | 2.859 | 2.788 | 2.799 | 2.805 |
| f5/f | −216.087 | −318.582 | −211.431 | −1249.264 | 752.171 |
| f6/f | −7.444 | −7.147 | −6.819 | −6.744 | −6.601 |
| f7/f | −7.501 | −7.830 | −7.955 | −7.723 | −7.912 |
| f8/f | −15.849 | −14.701 | −14.279 | −14.929 | −14.759 |
| f9/f | 1.267 | 1.289 | 1.287 | 1.313 | 1.316 |
| V1 − V3 | 32.500 | 32.500 | 32.500 | 32.500 | 32.500 |
| V1 − V5 | 36.750 | 36.750 | 36.750 | 36.750 | 36.750 |
| TTL/f | 1.324 | 1.236 | 1.212 | 1.220 | 1.222 |
| BFL/f | 0.223 | 0.141 | 0.139 | 0.142 | 0.140 |
| TTL/(2*ImgHT) | 0.723 | 0.685 | 0.690 | 0.693 | 0.693 |
| FOV*ImgHT/f | 71.542 | 70.376 | 70.922 | 68.280 | 68.496 |
| f1/f2 | 13.741 | 13.672 | 13.728 | 13.858 | 13.887 |
| f4/f6 | −0.389 | −0.400 | −0.409 | −0.415 | −0.425 |
| l(f7 + f8)l/f9 | 18.429 | 17.476 | 17.282 | 17.251 | 17.232 |
| f3/f9 | −1.218 | −1.183 | −1.158 | −1.139 | −1.139 |
| f3/f10 | 1.488 | 1.514 | 1.541 | 1.547 | 1.551 |
| f3/9 + f3/f10 | 0.270 | 0.332 | 0.384 | 0.407 | 0.412 |
| (R17 + R18)/(R17 − R18) | −3.246 | −3.255 | −3.261 | −3.308 | −3.308 |

TABLE 24

| Conditional Expression | Sixth embodiment | Seventh embodiment | Eighth embodiment | Ninth embodiment | Tenth embodiment |
|---|---|---|---|---|---|
| f1/f | 13.025 | 15.971 | 16.918 | 15.597 | 11.096 |
| f2/f | 0.867 | 0.855 | 0.868 | 0.853 | 0.824 |
| f3/f | −1.515 | −1.518 | −1.579 | −1.483 | −1.301 |
| f4/f | 2.838 | 2.853 | 2.911 | 3.666 | 27.712 |
| f5/f | 99.885 | 84.192 | 71.326 | 3.676 | 1.471 |
| f6/f | −6.087 | −6.037 | −6.154 | −2.849 | −1.799 |
| f7/f | −8.408 | −9.306 | −11.880 | −19.830 | 23.285 |
| f8/f | −16.414 | −12.392 | −9.153 | −6.894 | −4.526 |
| f9/f | 1.356 | 1.335 | 1.316 | 1.333 | 1.301 |
| V1 − V3 | 32.500 | 32.500 | 32.500 | 32.500 | 32.500 |
| V1 − V5 | 36.750 | 36.750 | 36.750 | 36.750 | 36.750 |
| TTL/f | 1.224 | 1.231 | 1.240 | 1.255 | 1.282 |
| BFL/f | 0.134 | 0.133 | 0.130 | 0.128 | 0.131 |
| TTL/(2*ImgHT) | 0.695 | 0.703 | 0.706 | 0.711 | 0.727 |
| FOV*ImgHT/f | 67.822 | 67.288 | 68.318 | 71.294 | 66.494 |
| f1/f2 | 15.017 | 18.690 | 19.488 | 18.288 | 13.466 |
| f4/f6 | −0.466 | −0.473 | −0.473 | −1.287 | −15.404 |
| l(f7 + f8)l/f9 | 18.299 | 16.253 | 15.979 | 20.053 | 14.419 |
| f3/f9 | −1.117 | −1.137 | −1.200 | −1.113 | −1.000 |
| f3/f10 | 1.530 | 1.578 | 1.673 | 1.392 | 0.948 |
| f3/9 + f3/f10 | 0.413 | 0.441 | 0.473 | 0.279 | −0.052 |
| (R17 + R18)/(R17 − R18) | −3.351 | −3.413 | −3.117 | −3.247 | −3.177 |

Figure 21:
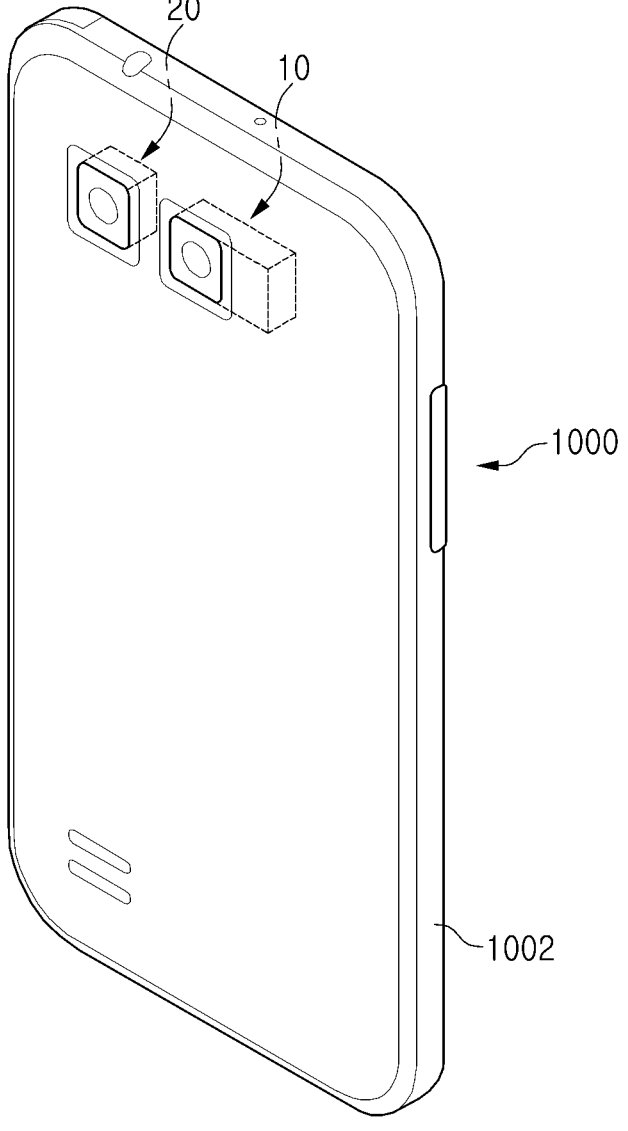
FIG. 21 is a perspective view of an electronic device including an imaging lens system according to an embodiment of the present disclosure.

Next, an example of an electronic device according to the present disclosure will be described with reference to FIG. 21.

An electronic device according to the present disclosure may include an imaging lens system according to an embodiment. For example, the electronic device may include at least one of the imaging lens systems according to the first to tenth embodiments. As a specific example, the electronic device may include an imaging lens system 100 according to the first embodiment. An electronic device according to an embodiment may be a portable terminal 1000 as illustrated in FIG. 21. However, a shape of the electronic device is not limited to the portable terminal 1000. For example, an electronic device according to another embodiment may be configured in a form of a laptop computer.

The portable terminal 1000 may include one or a plurality of camera modules 10 and 20. For example, two camera modules 10 and 20 may be installed in a body 1002 of the portable terminal 1000 at a predetermined interval. The first camera module 10 and the second camera module 20 may be configured to capture an image of an object in the same direction. For example, the first camera module 10 and the second camera module 20 may be mounted side by side on one surface of the portable terminal 1000.

At least one of the first camera module 10 and the second camera module 20 may include an imaging lens system according to the first to tenth embodiments. For example, the second camera module 20 may include the imaging optical system 100 according to the first embodiment.

As set forth above, according to the present disclosure, the imaging lens system according to the present disclosure may perform high-resolution imaging and photographing even in a low-light environment.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens, a second lens, a third lens, a fourth lens, a fifth lens, a sixth lens, a seventh lens, an eighth lens, a ninth lens, and a tenth lens, sequentially disposed from an object side toward an imaging plane,
wherein the ninth lens has a convex object-side surface, and
wherein the following conditional expressions are satisfied,
f number≤1.69, and
TTL/(2*ImgHT)<0.730 where TTL is a distance from an object-side surface of the first lens to the imaging plane, and ImgHT is a height of the imaging plane.

2. The imaging lens system of claim 1, wherein the following conditional expression is satisfied,
0<f1/f<30
where f is a focal length of the imaging lens system, and f1 is a focal length of the first lens.

3. The imaging lens system of claim 1, wherein the following conditional expression is satisfied,
0<f2/f<3.0
where f is a focal length of the imaging lens system, and f2 is a focal length of the second lens.

4. The imaging lens system of claim 1, wherein the following conditional expression is satisfied,
−3.0<f3/f<0
where f is a focal length of the imaging lens system, and f3 is a focal length of the third lens.

5. The imaging lens system of claim 1, wherein the following conditional expression is satisfied,
−200<f6/f<200
where f is a focal length of the imaging lens system, and f6 is a focal length of the sixth lens.

6. The imaging lens system of claim 1, wherein the following conditional expression is satisfied,
−20<f7/f
where f is a focal length of the imaging lens system, and f7 is a focal length of the seventh lens.

7. The imaging lens system of claim 1, wherein the following conditional expression is satisfied,
−30<f8/f<3.0
where f is a focal length of the imaging lens system, and f8 is a focal length of the eighth lens.

8. The imaging lens system of claim 1, wherein the following conditional expression is satisfied,
TTL/f<1.5
where f is a focal length of the imaging lens system.

9. The imaging lens system of claim 1, wherein the following conditional expression is satisfied,
BFL/f<0.5
where BFL is a distance from an image-side surface of the tenth lens to the imaging plane, and f is a focal length of the imaging lens system.

10. An electronic device, comprising:
the imaging lens system of claim 1,
wherein the imaging lens system further comprises an image sensor, and
wherein the imaging plane is formed on one surface of the image sensor or inside the image sensor.

11. An imaging lens system, comprising:
a first lens, a second lens, a third lens, a fourth lens, a fifth lens, a sixth lens, a seventh lens, an eighth lens, a ninth lens, and a tenth lens, sequentially disposed from an object side toward an imaging plane,
wherein the imaging lens system has a total number of ten lenses with refractive power, and
wherein the following conditional expression is satisfied,
10<f1/f2<20
where f1 is a focal length of the first lens, and f2 is a focal length of the second lens.

12. The imaging lens system of claim 11, wherein the following conditional expression is satisfied,
−0.6<f4/f6<−0.20
where f4 is a focal length of the fourth lens, and f6 is a focal length of the sixth lens.

13. The imaging lens system of claim 11, wherein the following conditional expression is satisfied, $$14<|(f7+f8)|/f9<21$$

where f7 is a focal length of the seventh lens, f8 is a focal length of the eighth lens, and f9 is a focal length of the ninth lens.

14. The imaging lens system of claim 11, wherein the following conditional expression is satisfied, $$-1.4<f3/f9<-0.8$$

where f3 is a focal length of the third lens, and f9 is a focal length of the ninth lens.

15. The imaging lens system of claim 11, wherein the following conditional expression is satisfied, $$0.8<f3/f10<2.0$$

where f3 is a focal length of the third lens, and f10 is a focal length of the tenth lens.

16. The imaging lens system of claim 11, wherein the following conditional expression is satisfied, $$-0.1<f3/f9+f3/f10<1.0$$

where f3 is a focal length of the third lens, f9 is a focal length of the ninth lens, and f10 is a focal length of the tenth lens.

17. The imaging lens system of claim 11, wherein the following conditional expression is satisfied, $$-4.0<(R17+R18)/(R17-R18)<-3.0$$

where R17 is a radius of curvature of an object-side surface of the ninth lens, and R18 is a radius of curvature of an image-side surface of the ninth lens.

18. An electronic device, comprising:

one or more cameras, wherein at least one of the one or more cameras comprises the imaging lens system of claim 11.

19. An imaging lens system, comprising:

a first lens having positive refractive power;

a second lens having positive refractive power;

a third lens having refractive power;

a fourth lens having refractive power;

a fifth lens having refractive power and a convex image-side surface;

a sixth lens having refractive power and a concave image-side surface;

a seventh lens having refractive power and a convex object-side surface;

an eighth lens having negative refractive power;

a ninth lens having refractive power; and a tenth lens having refractive power, wherein the first lens to the tenth lens are sequentially disposed from an object side toward an imaging plane, wherein the following conditional expression is satisfied, f number≤1.69.

20. An electronic device, comprising:

one or more cameras, wherein at least one of the one or more cameras comprises the imaging lens system of claim 19, wherein the imaging lens system further comprises an image sensor, and wherein the imaging plane is formed on one surface of the image sensor or inside the image sensor.

* * * * *